US012650592B2

(12) United States Patent　　(10) Patent No.:　US 12,650,592 B2

Weiss et al.　　(45) Date of Patent:　Jun. 9, 2026

(54) HYBRID PROJECTOR SYSTEM WITH SELF TEST

(71) Applicant: GM Global Technology Operations LLC, Detroit, MI (US)

(72) Inventors: John P. Weiss, Shelby Township, MI (US); Manoj Sharma, Troy, MI (US); Joseph F. Szczerba, Grand Blanc, MI (US); Thomas Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 406 days.

(21) Appl. No.: 18/345,034

(22) Filed: Jun. 30, 2023

(65) Prior Publication Data

US 2025/0004270 A1　　Jan. 2, 2025

(51) Int. Cl.
*G02B 27/01*　　(2006.01)
*G03B 21/20*　　(2006.01)

(52) U.S. Cl.
CPC ......... *G02B 27/01* (2013.01); *G03B 21/2033* (2013.01); *G03B 21/206* (2013.01); *G02B 2027/0138* (2013.01); *G02B 2027/014* (2013.01); *G02B 2027/0181* (2013.01); *G02B 2027/0196* (2013.01)

(58) Field of Classification Search
CPC ............ G02B 27/01; G02B 2027/0138; G02B 2027/0181; G02B 2027/014; G02B 2027/0196; G02B 2027/011; G02B 27/0101; G03B 21/2033; G03B 21/206; B60K 35/00
See application file for complete search history.

(56) References Cited

U.S. PATENT DOCUMENTS

| | | | | |
|---|---|---|---|---|
| 8,355,565 | B1 * | 1/2013 | Yang | G06T 7/593 |
| | | | | 382/154 |
| 10,189,405 | B2 * | 1/2019 | Boyd | B60K 35/60 |
| 2016/0252730 | A1 * | 9/2016 | Ikeda | G06F 3/011 |
| | | | | 345/8 |
| 2017/0363866 | A1 * | 12/2017 | Murzyn | B60K 35/23 |
| 2021/0109355 | A1 * | 4/2021 | Chang | H04N 9/3194 |
| 2021/0360211 | A1 | 11/2021 | Kawamura | |
| 2022/0063510 | A1 * | 3/2022 | Cha | B60R 11/0229 |

FOREIGN PATENT DOCUMENTS

DE　　102012010120 A1　　11/2013

* cited by examiner

*Primary Examiner* — Kee M Tung
*Assistant Examiner* — Nauman U Ahmad
(74) *Attorney, Agent, or Firm* — Vivacqua Crane, PLLC

(57) ABSTRACT

A projector system for a head up display within a vehicle includes a vehicle vector graphics projector adapted to project a second graphical image onto the inner surface of the windshield of the vehicle, the second graphical image having a greater brightness than the first graphical image and including at least one vehicle tell-tale, and a calibration system adapted to test and calibrate a displayed tell-tale within the second graphical image.

20 Claims, 10 Drawing Sheets

HYBRID PROJECTOR SYSTEM WITH SELF TEST

The present disclosure relates to systems and methods for displaying graphics in a vehicle, and more particularly, to graphics projectors for use in a vehicle.

To increase occupant awareness and convenience, vehicles may be equipped with display systems which are configured to provide information about an environment surrounding the vehicle to an occupant. Display systems may use human-interface devices, such as, for example, touchscreens, to provide information to the occupant. Display systems may also use head-up displays (HUD) to provide information to the occupant.

Vehicles generally include multiple tell-tales which are independently illuminated. A tell-tale, sometimes called a warning light, is an indicator of malfunction or operation of a system, indicated by a binary (on/off) illuminated light, symbol or text legend. Tell-tales are generally not part of a reconfigurable display or instrument cluster display due to replacement cost rules and bulb check and reliability requirements.

Thus, while current vehicle systems achieve their intended purpose, there is a need for a new and improved system for graphics projection that provides a low cost and high reliability solution for displaying such telltales and replaces individual, dedicated telltale illumination.

SUMMARY

According to several aspects of the present disclosure, a system for a head up display within a vehicle includes a vehicle vector graphics projector adapted to project a second graphical image onto the inner surface of the windshield of the vehicle, the second graphical image having a greater brightness than the first graphical image and including at least one vehicle tell-tale, and a calibration system adapted to test and calibrate a displayed tell-tale within the second graphical image.

According to another aspect, the calibration system includes a reference calibration system including a reference windshield, a reference vector graphics projector, wherein the reference vector graphics projector includes a reference vector graphics projector camera, a reference camera, and a reference controller in electrical communication with the reference vector graphics projector and the reference camera, wherein the reference controller is programmed to project a reference graphic on the reference windshield using the reference vector graphics projector, wherein the reference graphic is a vehicle tell-tale and includes a plurality of projected dots arranged in a two-dimensional array, and wherein an intended x-coordinate and an intended y-coordinate of each of the plurality of projected dots is defined by an intended reference graphic matrix, capture a first reference image of the reference graphic using the reference camera, and calculate at least one reference calibration matrix based at least in part on the first reference image of the reference graphic.

According to another aspect, when calculating the at least one reference calibration matrix, the reference controller is further programmed to determine a reference camera deviation matrix, wherein the reference camera deviation matrix encodes deviations in the reference graphic due to characteristics of the reference windshield, and determine a reference vector graphics projector camera transformation matrix based at least in part on the reference camera deviation matrix.

According to another aspect, when determining the reference camera deviation matrix, the reference controller is further programmed to identify a plurality of perceived dots of the reference graphic in the first reference image, determine an actual x-coordinate and an actual y-coordinate of each of the plurality of perceived dots of the reference graphic in the first reference image, generate an actual reference graphic matrix, wherein each element of the actual reference graphic matrix contains the actual x-coordinate and the actual y-coordinate of one of the plurality of perceived dots of the reference graphic in the first reference image, and calculate the reference camera deviation matrix by subtracting the actual reference graphic matrix from the intended reference graphic matrix.

According to another aspect, when determining the reference vector graphics projector camera transformation matrix, the reference controller is further programmed to generate a deviation-compensated reference graphic matrix by summing the intended reference graphic matrix and the reference camera deviation matrix, project a deviation-compensated reference graphic on the reference windscreen using the reference vector graphics projector, wherein a location of each of a plurality of projected dots of the deviation-compensated reference graphic is defined by the deviation-compensated reference graphic matrix, capture a second reference image of the deviation-compensated reference graphic using the reference vector graphics projector camera, identify a plurality of perceived dots of the deviation-compensated reference graphic in the second reference image, determine an actual coordinate and an actual y-coordinate of each of the plurality of perceived dots of the deviation-compensated reference graphic in the second reference image, generate a reference vector graphics projector camera matrix, wherein each element of the reference vector graphics projector camera matrix contains the actual x-coordinate and the actual y-coordinate of one of the plurality of perceived dots of the deviation-compensated reference graphic in the second reference image, and determine the reference vector graphics projector camera transformation matrix by subtracting the reference vector graphics projector camera matrix from the reference camera deviation matrix.

According to another aspect, the vehicle vector graphics projector includes a vehicle vector graphics projector camera, and the hybrid projector system includes a vehicle controller in electrical communication with the vehicle vector graphics projector, wherein the vehicle controller is programmed to project the reference graphic on the vehicle windshield using the vehicle vector graphics projector, capture a calibration image of the reference graphic using the vehicle vector graphics projector camera, calculate a vehicle vector graphics projector calibration matrix based at least in part on the at least one reference calibration matrix and the calibration image of the reference graphic, and apply the vehicle vector graphics projector calibration matrix to each frame projected using the vehicle vector graphics projector.

According to another aspect, when calculating the vehicle vector graphics projector calibration matrix, the vehicle controller is further programmed to determine a vehicle vector graphics projector deviation matrix based at least in part on the at least one reference calibration matrix and the calibration image of the reference graphic, and calculate the vehicle vector graphics projector calibration matrix by subtracting the vehicle vector graphics projector deviation matrix from the reference TWD camera transformation matrix.

According to another aspect, when determining the vehicle vector graphics projector deviation matrix, the vehicle controller is further programmed to identify a plurality of perceived dots of the reference graphic in the calibration image, determine an actual x-coordinate and an actual y-coordinate of each of the plurality of perceived dots of the reference graphic in the calibration image, generate an actual vehicle vector graphics projector matrix, wherein each element of the actual vehicle vector graphics projector matrix contains the actual x-coordinate and the actual y-coordinate of one of the plurality of perceived dots of the reference graphic in the calibration image, and calculate the vehicle vector graphics projector deviation matrix by subtracting the actual vehicle vector graphics projector matrix from the reference vector graphics projector camera matrix.

According to another aspect, the reference camera is fixedly mounted at a reference occupant eyellipse location, and wherein the reference occupant eyellipse location is a predetermined location in space relative to the reference windshield.

According to another aspect, the vehicle vector graphics projector includes a light source module including a light-emitting diode (LED) array configured to produce a source light, an optical filter in optical communication with the LED array, wherein the optical filter is configured to receive the source light and transmit a filtered light, and a focusing lens in optical communication with the optical filter, wherein the focusing lens is configured to receive the filtered light and transmit a narrow-beam light, an optical collimator in optical communication with the light source module, wherein the optical collimator is configured to receive the narrow-beam light and transmit a collimated light, and an optoelectrical mirror in optical communication with the optical collimator, wherein the optoelectrical mirror is configured to direct the collimated light to form a graphic.

According to another aspect, the optical filter is an optical bandpass filter configured to filter the source light and transmit the filtered light, wherein the filtered light includes only light having a wavelength within a passband of the optical bandpass filter.

According to another aspect, the system further includes a plurality of light source modules in optical communication with the optical collimator.

According to another aspect, the system further includes an optical waveguide in optical communication with the plurality of light source modules and the optical collimator, wherein the optical waveguide is configured to transmit the narrow-beam light from each of the plurality of light source modules to the optical collimator.

According to another aspect, the optical waveguide is a fiber-optic cable in optical communication with the focusing lens of each of the plurality of light source modules using a fiber-optic coupler.

According to another aspect, the system further includes a plurality of dichroic mirrors, wherein each of the plurality of dichroic mirrors is in optical communication with one of the plurality of light source modules, and wherein each of the plurality of dichroic mirrors is configured to transmit the narrow-beam light from one of the plurality of light source modules to the optical collimator.

According to another aspect, each of the plurality of dichroic mirrors is configured to reflect a predetermined wavelength of the narrow-beam light and transmit all other wavelengths of the narrow-beam light.

According to several aspects of the present disclosure, a method of displaying graphics with a projector system for a head up display within a vehicle includes projecting, with a vehicle vector graphics projector, a second graphical image onto the inner surface of the windshield of the vehicle, the second graphical image having a greater brightness than the first graphical image and including at least one vehicle tell-tale, and testing and calibrating, with a calibration system, a displayed vehicle tell-tale within the second graphical image.

According to another aspect, the testing and calibrating, with the calibration system, the displayed vehicle tell-tale within the second graphical image further includes projecting a reference graphic on a reference windscreen using a reference vector graphics projector, wherein the reference graphic is a vehicle tell-tale, capturing a first reference image of the reference graphic using a reference camera, determining a reference camera deviation matrix, wherein the reference camera deviation matrix encodes deviations in the reference graphic due to characteristics of the reference windscreen by identifying a plurality of perceived dots of the reference graphic in the first reference image, determining an actual x-coordinate and an actual y-coordinate of each of the plurality of perceived dots of the reference graphic in the first reference image, generating an actual reference graphic matrix, wherein each element of the actual reference graphic matrix contains the actual x-coordinate and the actual y-coordinate of one of the plurality of perceived dots of the reference graphic in the first reference image, and calculating the reference camera deviation matrix by subtracting the actual reference graphic matrix from an intended reference graphic matrix, wherein the intended reference graphic matrix is a two-dimensional array including an intended x-coordinate and an intended y-coordinate of each of a plurality of projected dots, determining a reference vector graphics projector camera transformation matrix based at least in part on the reference camera deviation matrix by generating a deviation-compensated reference graphic matrix by summing the intended reference graphic matrix and the reference camera deviation matrix, projecting a deviation-compensated reference graphic on the reference windscreen using the reference vector graphics projector, wherein a location of each of a plurality of projected dots of the deviation-compensated reference graphic is defined by the deviation-compensated reference graphic matrix, capturing a second reference image of the deviation-compensated reference graphic using a reference vector graphics projector camera, identifying a plurality of perceived dots of the deviation-compensated reference graphic in the second reference image, determining an actual x-coordinate and an actual y-coordinate of each of the plurality of perceived dots of the deviation-compensated reference graphic in the second reference image, generating a reference vector graphics projector camera matrix, wherein each element of the reference vector graphics projector camera matrix contains the actual x-coordinate and the actual y-coordinate of one of the plurality of perceived dots of the deviation-compensated reference graphic in the second reference image, and determining the reference vector graphics projector camera transformation matrix by subtracting the reference vector graphics projector camera matrix from the reference camera deviation matrix, projecting the reference graphic on the vehicle windshield using the vehicle vector graphics projector, capturing a calibration image of the reference graphic using a vehicle vector graphics projector camera, calculating a vehicle vector graphics projector calibration matrix based at least in part on the reference camera deviation matrix, the reference TWD camera transformation matrix, and the calibration image by determining a vehicle vector graphics projector deviation matrix based at least in part on the reference vector graphics projector camera matrix and the calibration image of the reference graphic by identifying a plurality of perceived dots of the reference graphic in the calibration image, determining an actual x-coordinate and an actual y-coordinate of each of the plurality of perceived dots of the reference graphic in the calibration image, generating an actual vehicle vector graphics projector matrix, wherein each element of the actual vehicle vector graphics projector matrix contains the actual x-coordinate and the actual y-coordinate of one of the plurality of perceived dots of the reference graphic in the calibration image, and calculating the vehicle vector graphics projector deviation matrix by subtracting the actual vehicle vector graphics projector matrix from the reference vector graphics projector camera matrix, and calculating the vehicle vector graphics projector calibration matrix based at least in part on the vehicle vector graphics projector deviation matrix by subtracting the vector graphics projector deviation matrix from the vector graphics projector camera transformation matrix, and applying the vehicle vector graphics projector calibration matrix to each frame projected using the vehicle vector graphics projector.

According to another aspect, the projecting, with a vector graphics projector, a second graphical image onto the inner surface of the windshield of the vehicle further includes producing, with a light-emitting diode (LED) array of a light source module, a source light, receiving, with an optical bandpass filter of the light source module in optical communication with the LED array, the source light, and filtering, with the optical bandpass filter, the source light, and transmitting, through the optical bandpass filter, filtered light having a wavelength within a passband of the optical bandpass filter, receiving, with a focusing lens of the light source module in optical communication with the optical filter, the filtered light, and transmitting, with the focusing lens, a narrow-beam light, receiving, with an optical collimator in optical communication with the light source module, the narrow-beam light, and transmitting, with the optical collimator, a collimated light, and directing, with an opto-electrical mirror in optical communication with the optical collimator, the collimated light to form a graphic.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
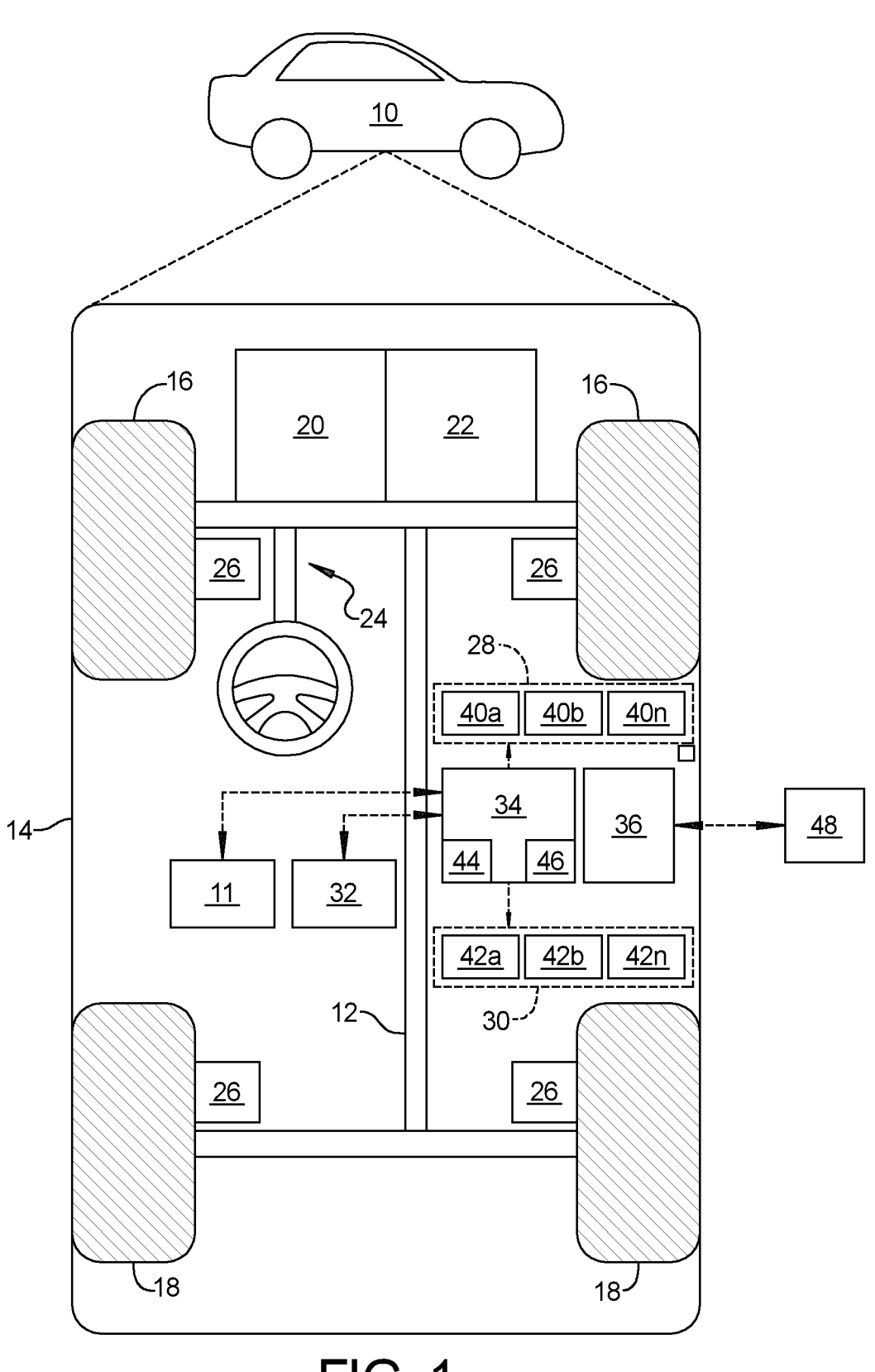
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated hybrid projector system for a head up display 11 within the vehicle 10 in accordance with various embodiments. In general, the hybrid projector system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield 56 of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
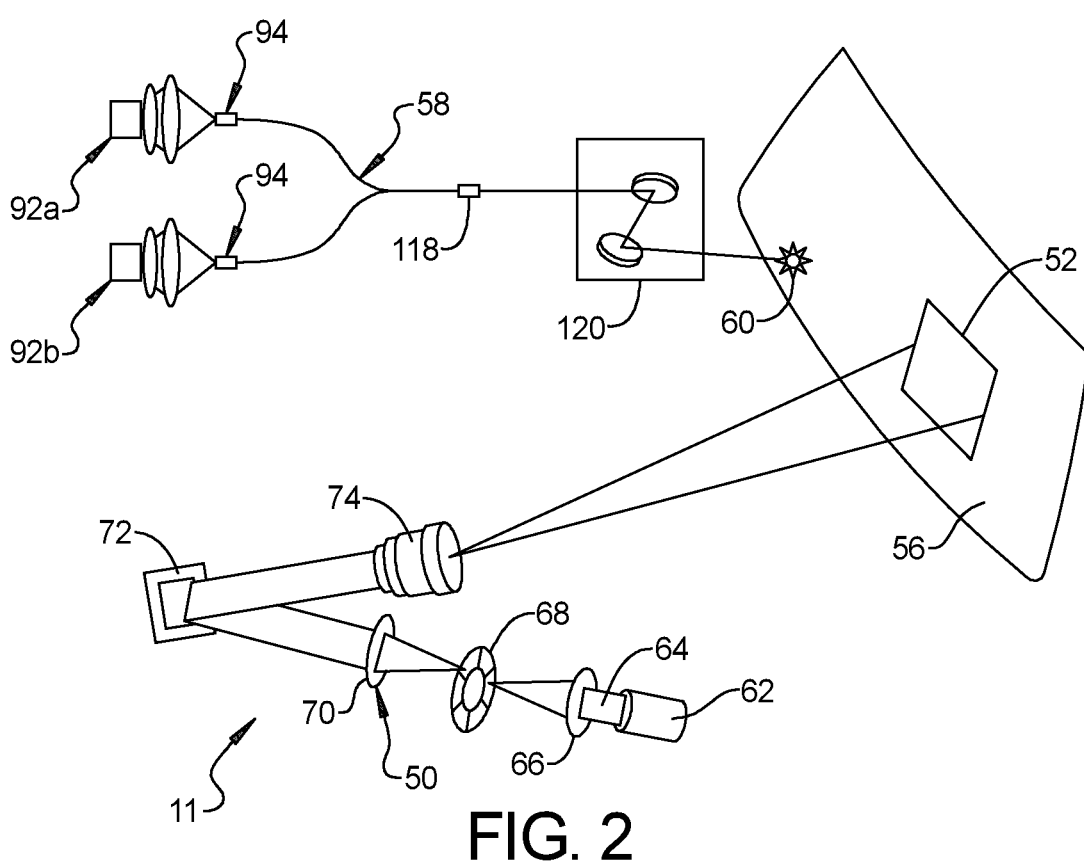
FIG. 2 is a schematic diagram of a system according to an exemplary embodiment, wherein a second graphical image from a vector graphic projector is displayed adjacent a first graphical image from a digital light projector.

Referring to FIG. 2, in an exemplary embodiment, the system 11 is a hybrid projector system 11 that includes a digital light projector (DLP) 50 adapted to project a first graphical image 52 onto an inner surface 54 of a windshield 56 of the vehicle 10, and a vector graphics projector (VGP) 58 adapted to project a second graphical image 60 onto the inner surface 54 of the windshield 56 of the vehicle 10. It should be understood that the system 11 of may be utilized without a DLP 50 without departing from the novel features of the present disclosure.

The DLP 50 projects a first graphical image 52 that contains various information/infotainment applications. The DLP 50 is capable of projecting two-dimensional and three-dimensional images that depict objects such as pedestrians, buildings and other vehicles in the environment surrounding the vehicle 10. In an exemplary embodiment, the DLP 50 includes a light source 62 adapted to project an excitation light 64, a condensing lens 66 adapted to focus the excitation light 64 from the light source 62, a color filter 68 (color wheel) adapted to split the focused excitation light 64 into red, green and blue light, a shaping lens 70 adapted to focus the excitation light 64 passing through the color filter 68, a digital micro-mirror device (DMD) 72 adapted to re-direct the excitation light 64, and a projection lens 74 adapted to receive the excitation light 64 from the digital micro-mirror device (DMD) 72 and project the excitation light 64 to the inner surface 54 of the windshield 56.

Figure 3:
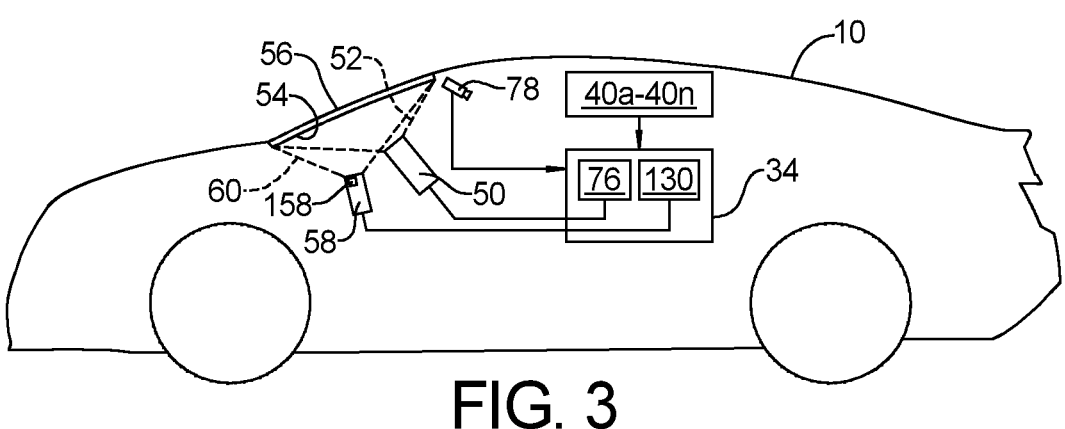
FIG. 3 is a schematic side view of the vehicle shown in FIG. 1.

Referring to FIG. 3, the vehicle controller 34 includes a DLP engine 76. The DLP engine 76 includes a programmable processor including programming to monitor various inputs and determine what information is appropriate to display. The DLP engine 76 can communication directly with various systems and components, or the DLP engine 76 can alternatively or additionally communicate over a LAN/CAN system. The DLP engine 76 utilizes information regarding the operational environment of the vehicle 10 derived from a number of inputs. Various sensing devices 40a-40n collect and provide information. The sensing devices 40a-40n include a camera or image capturing device taking periodic or sequential images representing a view from the vehicle 10. The windshield 56 is equipped with features capable of displaying an image projected thereupon while remaining transparent or substantially transparent such that occupants of the vehicle 10 can clearly observe outside of the vehicle 10 through the windshield 56. It should be understood that, as depicted, the windshield 56 is in the front of the vehicle 10, other surfaces within the vehicle 10 could be used for projection, including side windows and a rear window. Additionally, the view on the front windshield 56 could be continued upon the front vehicle "A-pillars" and onto the side windows as a continuous image.

The DLP engine 76 includes display software or programming translating requests to display information from the DLP engine 76 in graphical representations describing the information. The DLP engine 76 includes programming to compensate for the curved and tilted surface of the windshield 56 and any other surfaces onto which the first graphical image 52 is to be projected. The DLP engine 76 controls the light source 62 which includes a laser or projector device producing an excitation light 64 to project the first graphical image 52.

An occupant monitoring system 78 includes sensors known in the art to approximate a location of the head of an occupant and further the orientation or gaze location of the eyes of the occupant. Based upon the output of the occupant monitoring system 78 and input data tracking location information regarding the environment around the vehicle 10, the DLP engine 76 can accurately position the first graphical image 52 such that the occupant sees the first graphical image 52 overlaid with visual images through the windshield 56.

The system 11 described above includes eye sensing and head sensing devices allowing estimation of eye location, allowing registration of images upon the windshield 56 such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle 10 can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the windshield 56 are contemplated, and the disclosure is not intended to be limited to the particular embodiments described herein.

Figure 4:
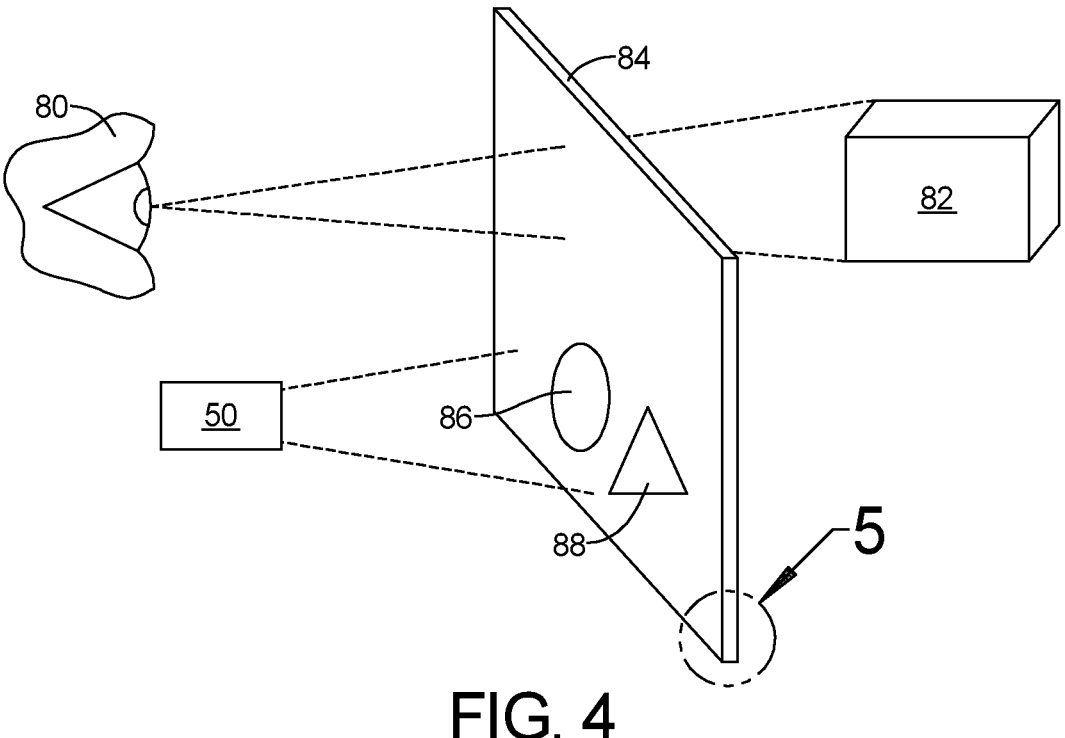
FIG. 4 is schematic illustration of a substrate for the windshield of the vehicle according to an exemplary embodiment.
Figure 5:
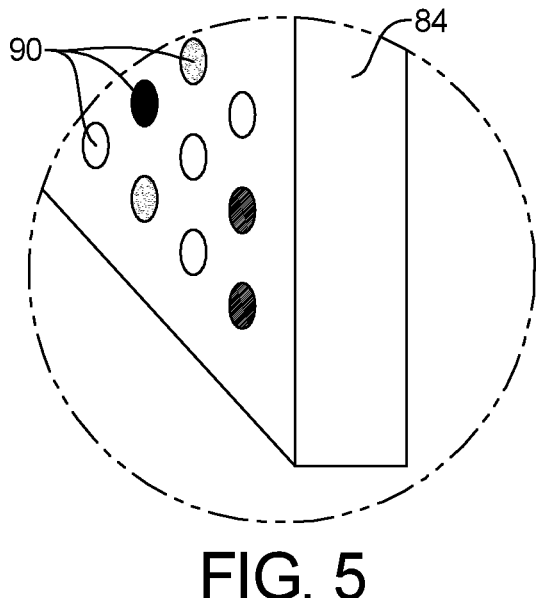
FIG. 5 is a enlarged portion of FIG. 4, as indicated by the circle labelled "FIG. 5" in FIG. 4.

The windshield 56 functions as a medium through which relevant features are observable while serving as a display device upon which the first graphical image 52 may be displayed. The windshield 56 is both transparent and capable of displaying images projected by an excitation light 64. Referring to FIG. 4 and FIG. 5, an occupant 80 is able to see an arbitrary object (e.g. cube 82) through a substrate 84 positioned on the windshield 56. The substrate 84 may be transparent or substantially transparent. While the occupant 80 sees the arbitrary object 82 through the substrate 84, the occupant 80 can also see images (e.g. circle 86 and triangle 88) that are created at the substrate 84. The substrate 84 may be part of the windshield 56, a glass substrate, a plastic substrate, a polymer substrate, or other transparent (or substantially transparent) medium that would be appreciated by one of ordinary skill in the art. Other substrates may complement the substrate 84 to provide for tinting, substrate protection, light filtering (e.g. filtering external ultraviolet light), and other functions.

FIG. 5 depicts illumination of transparent displays illuminated with excitation light 64 (e.g. ultraviolet light or infrared light) from a light source 62. The substrate 84 receives excitation light 64 from the light source 62. The received excitation light 64 may be absorbed by light emitting material 90 at the substrate 84. When the light emitting material receives the excitation light 64, the light emitting material 90 emits visible light. Accordingly, images (e.g. circle 86 and triangle 88) may be created at the substrate 84 by selectively illuminating the substrate 84 with excitation light 64.

In an exemplary embodiment, the light emitting material 90 includes transparent phosphors that are embedded into the substrate 84. The transparent phosphors are light emitting particles which fluoresce in response to being excited by the excitation light 64. In an exemplary embodiment, the transparent phosphors are red, green, and blue (RGB) phosphors, allowing full color. The use of monochrome and/or two-color phosphors is also within the scope of the present disclosure. When excitation light 64 is absorbed by the transparent phosphors, visible light is emitted by the transparent phosphors. The excitation light 64 is provided by the light source 62. Use of the substrate 84 and light emitting material 90 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 64 may be ultraviolet light, in accordance with embodiments of the present disclosure. If the excitation light 64 is ultraviolet light, then when the light emitting material 90 emits visible light in response to the ultraviolet light, a down-conversion physical phenomenon occurs. Specifically, ultraviolet light has a shorter wavelength and higher energy than visible light. Accordingly, when the light emitting material 90 absorbs the ultraviolet light and emits lower energy visible light, the ultraviolet light is down-converted to visible light because the ultraviolet light's energy level goes down when it is converted into visible light.

It should be understood, the excitation wavelengths described herein are used particularly for a given sheet of phosphors. Other technology could also be used, such as a holographic grating (Bragg gratings) based technology which uses visible light projectors, wherein RGB LEDs are used to make a vector graphics projector and an RGB-DLP projector.

As shown in FIG. 2 and FIG. 3, the excitation light 64 is output by the light source 62 of the DLP 50. In an exemplary embodiment, the light source 62 is a micro-mirror array (MMA) projector (e.g. a digital light processing (DLP) projector 50). In the DLP 50, the first graphical image 52 is created by microscopically small mirrors laid out in a matrix on a semiconductor chip within the DMD 72. An MMA projector that outputs ultraviolet light may be similar to a MMA projector that outputs visible light, except that the color filter 68 has light filters that are tailored to the ultraviolet light spectrum. In other embodiments, the DLP 50 is a liquid crystal display (LCD) projector. In embodiments, the DLP 50 may be a liquid crystal on silicon (LCOS) projector. In embodiments, the DLP 50 may be an analog projector (e.g. a slide film projector or a movie film projector). One of ordinary skill in the art would appreciate other types of projectors which may be used to project ultraviolet light on the substrate 84.

Figure 6:
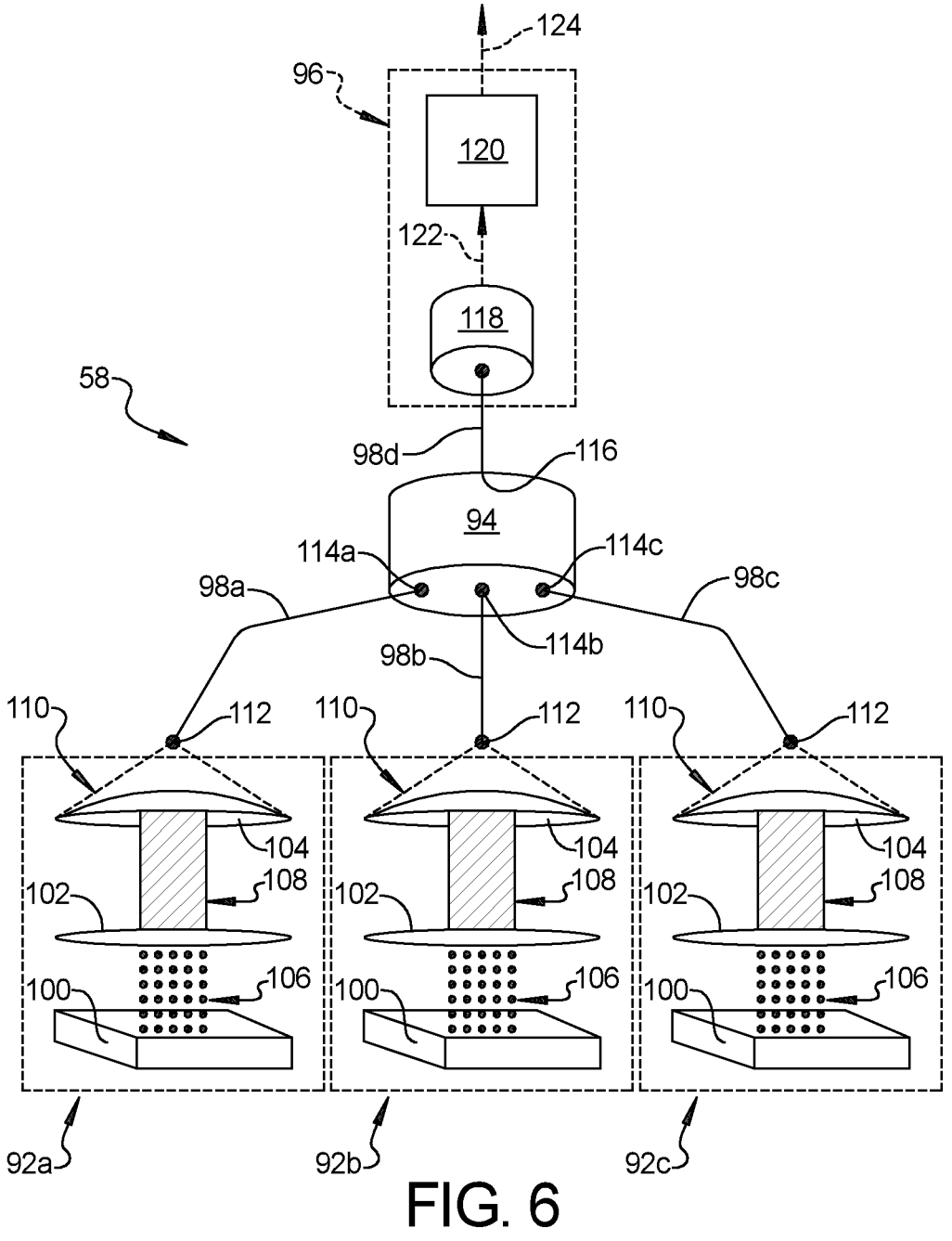
FIG. 6 is a schematic diagram of a vector graphic projector including a waveguide comprising fiber optic cables.

Referring to FIG. 6, a schematic diagram of an exemplary embodiment of the VGP 58 is shown. The VGP 58 generally includes a first light source module 92a, a second light source module 92b, a third light source module 92c, a fiber-optic coupler 94, and an output module 96.

The components of the VGP 58 (i.e., the first light source module 92a, a second light source module 92b, a third light source module 92c, a fiber-optic coupler 94, and an output module 96) are in optical communication with each other. In the scope of the present disclosure, optical communication means that light can propagate through the space between the components and interact with the optical properties of each component. Optical communication may be facilitated by positioning the first light source module 92a, a second light source module 92b, a third light source module 92c, a fiber-optic coupler 94, and an output module 96 such that light is transmitted between the components due to the intrinsic reflection and/or refraction characteristics of the components and/or characteristics of a medium between the components (e.g., air). Optical communication may also be facilitated by use of an optical waveguide. In the scope of the present disclosure, an optical waveguide is a physical structure that is designed to confine and guide light along a specified path (i.e., between the first light source module 92a, a second light source module 92b, a third light source module 92c, a fiber-optic coupler 94, and an output module 96). In a non-limiting example, a plurality of fiber-optic cables 98a, 98b, 98c, 98d are used to establish optical communication. In an exemplary embodiment, the fiber-optic cables 98a, 98b, 98c, 98d are optoelectrical cables which transmit light, acting as optical waveguides. In a non-limiting example, the fiber-optic cables 98a, 98b, 98c, 98d contain multiple strands of glass or plastic fibers. The fibers are bundled together and surrounded by a protective coating. The first fiber-optic cable 98a is used to establish optical communication between the first light source mode 92a and the fiber-optic coupler 94. The second fiber-optic cable 98b is used to establish optical communication between the second light source module 92b and the fiber-optic coupler 94. The third fiber-optic cable 98c is used to establish optical communication between the third light source module 92c and the fiber-optic coupler 94. The fourth fiber-optic cable 98d is used to establish optical communication between the fiber-optic coupler 94 and the output module 96. It should further be understood that various additional methods for establishing optical communication between optical components, including, for example, planar waveguides, rib waveguides, channel waveguides, hollow core waveguides, and the like are within the scope of the present disclosure.

The first light source module 92a includes a light-emitting diode (LED) array 100, an optical filter 102, and a focusing lens 104. The LED array 100 is used to provide a light source for the first light source module 92a. In an exemplary embodiment, the LED array 100 includes a plurality of light-emitting diodes (LEDs) electrically connected in a series or parallel configuration (not shown). The LED array 100 further includes at least two electrical terminals (not shown) electrically connected to the plurality of LEDs. The plurality of LEDs are arranged such as to achieve a high density of LEDs in a relatively small area. In a non-limiting example, the plurality of LEDs are arranged in a grid pattern. In another non-limiting example, the plurality of LEDs are arranged in a radial pattern. The plurality of LEDs are mechanically affixed to a substrate to provide structural stability to the arrangement of the plurality of LEDs. In a non-limiting example, the substrate is a printed circuit board (PCB). In another non-limiting example, the substrate is a metal-core printed circuit board (MCPCB) including a metal layer which contributes to thermal management of the plurality of LEDs by dissipating heat.

When an electrical current is passed through the plurality of LEDs using the electrical terminals, the plurality of LEDs emit light. The light emitted by the plurality of LEDs of the LED array 100 is referred to as a source light 106. In an exemplary embodiment, the source light 106 is polychromatic, meaning that the source light 106 contains multiple wavelengths of light (e.g., light having wavelengths between 380 nanometers and 460 nanometers). In another exemplary embodiment, the source light 106 is monochromatic, meaning that the source light 106 contains only a single wavelength of light (e.g., 380 nanometers, 405 nanometers, or 460 nanometers). It should be understood that the aforementioned wavelengths and wavelength ranges are merely exemplary in nature. The LED array 100 is configured such that the source light 106 is incident upon the optical filter 102.

The optical filter 102 is used to filter the source light 106. In an exemplary embodiment, the optical filter 102 is configured to receive the source light 106 and transmit a filtered light 108. In the scope of the present disclosure, the filtered light 108 is light having only wavelengths within a passband of the optical filter 102. In a non-limiting example, the optical filter 102 includes a substrate material (e.g., glass or quartz), onto which one or more layers of thin film are deposited. The thin film layers are designed to either absorb or refract specific wavelengths of light. In a first exemplary embodiment, the optical filter 102 is an interference optical bandpass filter. In a non-limiting example, the interference optical bandpass filter includes alternating dielectric layers of materials with different refractive indices. The alternating layers are configured to create an interference pattern that enhances the transmission of wavelengths within the passband and suppresses other wavelengths (analogous to a Fabry-Pérot interferometer).

In another exemplary embodiment, the optical filter 102 is an absorptive optical bandpass filter. In a non-limiting example, the absorptive optical bandpass filter includes one or more layers of an absorbing dielectric material deposited on the substrate. The absorbing layers dissipate the unwanted wavelengths through absorption, while the wavelengths within the passband are transmitted. In another exemplary embodiment, the passband of the optical filter 102 includes only monochromatic light having a single wavelength (e.g., 380 nanometers, 405 nanometers, 460 nanometers). Therefore, the filtered light 108 contains only light having a single wavelength. It should be understood that the aforementioned wavelengths are merely exemplary in nature, and that the passband of the optical filter 102 may include other wavelengths without departing from the scope of the present disclosure. The optical filter 102 is configured such that the filtered light 108 is incident upon the focusing lens 104.

The focusing lens 104 is used to concentrate the filtered light 108 to produce a narrow-beam light 110. In an exemplary embodiment, the focusing lens 104 includes a curved transparent substrate (e.g., glass or other transparent material). When the filtered light 108 passes through the focusing lens 104, the curvature of the focusing lens 104 causes the filtered light 108 to refract towards a focal point 112. The position of the focal point 112 is determined by the curvature and refractive index of the focusing lens 104. The focal point 112 of the focusing lens 104 is a termination of the first fiber-optic cable 98a, such that the narrow-beam light 110 is transmitted from the focusing lens 104 to the fiber-optic coupler 94 via the first fiber-optic cable 98a.

Figure 7:
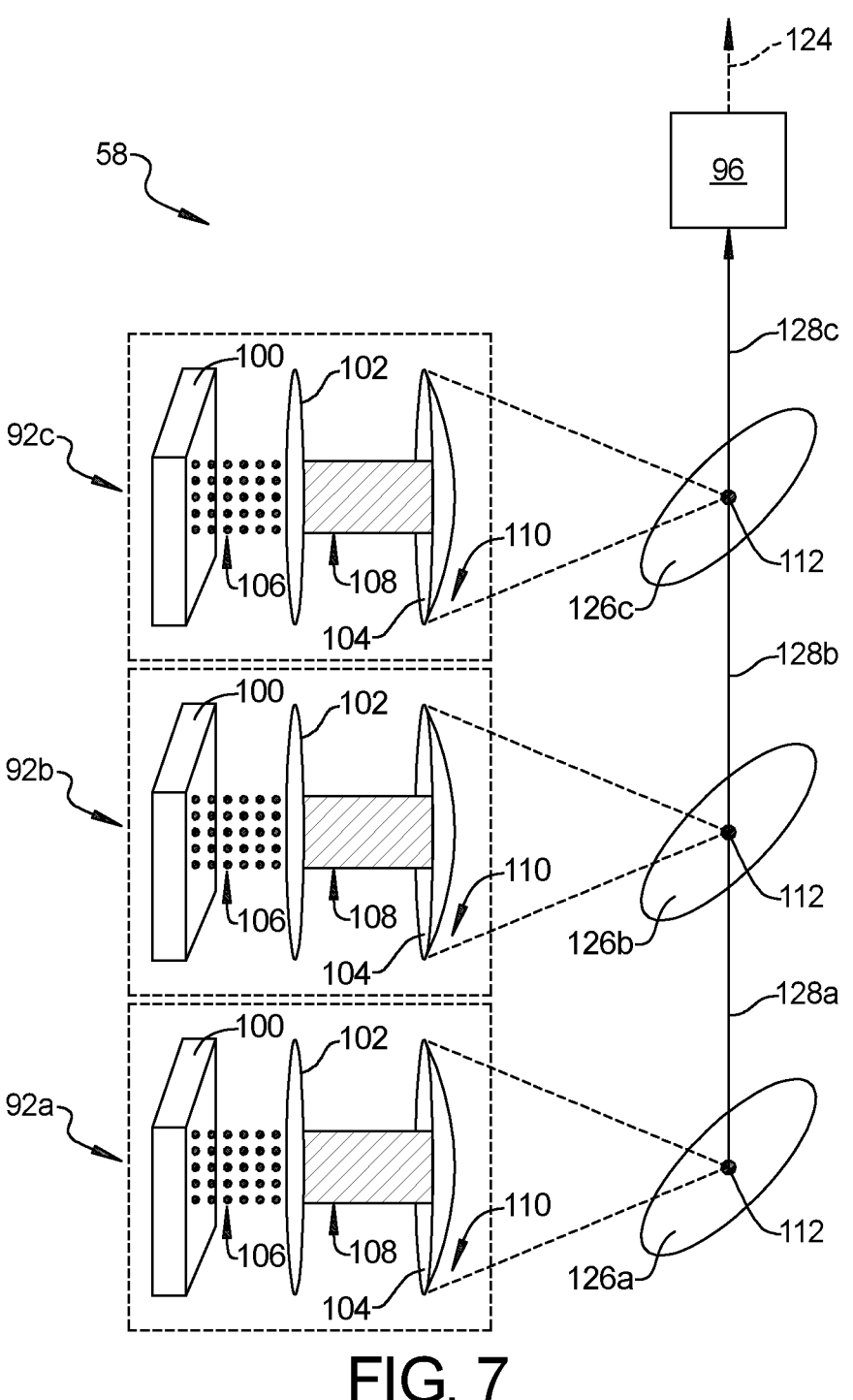
FIG. 7 is a schematic diagram of a vector graphic projector including dichroic mirrors.

It should be understood that the second light source module 92b and the third light source module 92c each include the same components as the first light source module 92a (i.e., the LED array 100, the optical filter 102, and the focusing lens 104). Therefore, the description provided above for the first light source module 92a also applies to the second light source module 92b and the third light source module 92c. It should be understood by those skilled in the art that the VGP 58 can include any suitable number of light source modules. While FIG. 2 illustrates a first light source module 92a and a second light source module 92b, and FIG. 6 and FIG. 7 illustrate a first light source module 92a, a second light source module 92b, and a third light source module 92c, other numbers of light source modules may be used without departing from the scope of the present invention.

In an exemplary embodiment, each of the first light source module 92a, the second light source module 92b, and the third light source module 92c is configured to produce narrow-beam light 110 having a different wavelength. In a non-limiting example, the first light source module 92a produces narrow-beam light 110 having a wavelength of 380 nanometers. The second light source module 92b produces narrow-beam light 110 having a wavelength of 405 nanometers. The third light source module 92c produces narrow-beam light 110 having a wavelength of 460 nanometers. It should be understood that the first light source module 92a, the second light source module 92b, and the third light source module 92c may be configured to produce narrow-beam light 110 having different wavelengths without departing from the scope of the present disclosure.

The fiber-optic coupler 94 is used to combine the narrow-beam light 110 from each of the first light source module 92a, the second light source module 92b, and the third light source module 92c. In an exemplary embodiment, the fiber-optic coupler 94 includes a first input port 114a in optical communication with the first light source module 92a via the first fiber-optic cable 98a, a second input port 114b in optical communication with the second light source module 92b via the second fiber-optic cable 98b, and a third input port 114c in optical communication with the third light source module 92c via the third fiber-optic cable 98c. The fiber-optic coupler 94 further includes an output port 116. Each of the input ports 114a, 114b, 114c and output port 116 includes an optical fiber (not shown) which is aligned and fused with the optical fibers of the other ports. When light is introduced into one of the input ports 114a, 114b, 114c, the light propagates along the optical fiber and is transferred to the output port 116. Therefore, the intensity of the narrow-beam light 110 from each of the first light source module 92a, the second light source module 92b, and the third light source module 92c is summed at the output port 116 of the fiber-optic coupler 94. The output port 116 is in optical communication with the output module 96 via the fourth fiber-optic cable 98d.

The output module 96 is used to direct the narrow-beam light 110 from the output port 116 of the fiber-optic coupler 94 in order to project the second graphical image 60. The output module 96 includes an optical collimator 118 and an optoelectrical mirror 120.

The optical collimator 118 is used to produce a collimated light 122 from the narrow-beam light 110. In an exemplary embodiment, the optical collimator 118 includes a collimating lens, which is used to focus the narrow-beam light 110 into a parallel (i.e., collimated) beam. In a non-limiting example, the collimating lens is a plano-convex or double-convex lens which is configured to produce a desired beam divergence and collimation distance. The optical collimator 118 works by refracting the narrow-beam light 110 from the fiber-optic coupler 94 using the collimating lens to produce the collimated light 122. The optical collimator 118 is in optical communication with the optoelectrical mirror 120.

The optoelectrical mirror 120 is used to direct the collimated light 122 based on electrical signals. In the scope of the present disclosure, the optoelectrical mirror 120 is an electromechanical device (e.g., a microelectromechanical system) configured to direct light with high precision, accuracy, and speed in response to electrical signals. In an exemplary embodiment, the optoelectrical mirror 120 includes a digital micromirror device (DMD). The DMD is an optical microelectromechanical system that contains an array of mirrors which can be individually tilted to reflect light in a desired direction. In a non-limiting example, the DMD is used to create high-resolution images by reflecting the collimated light 122 onto a projection surface. The tilting mirrors on the DMD are controlled by an electronic driver, which rapidly modulates the mirrors to project the second graphical image 60 onto the windshield 56.

In another exemplary embodiment, the optoelectrical mirror 120 is a microelectromechanical scanning mirror. In an exemplary embodiment, the microelectromechanical scanning mirror is an optoelectrical device which utilizes at least one mirror to create high-resolution images. The at least one mirror may be tilted to reflect the collimated light 122 in a desired direction. The tilting action of the at least one mirror is controlled by an electronic driver, which rapidly modulates the mirrors to project the second graphical image 60 onto the windshield 56.

In yet another exemplary embodiment, the optoelectrical mirror 120 is a galvanometer mirror. In an exemplary embodiment, the galvanometer mirror is an optoelectrical device which utilizes at least one mirror which rotates on an axis to redirect the collimated light 122. The at least one mirror of the galvanometer mirror is controlled by a galvanometer, which is an electric motor which converts electrical current signals into mechanical movement. The galvanometer rapidly rotates the at least one mirror on the axis, allowing the collimated light 122 to be redirected to scan the collimated light 122 across the windshield 56 and display the second graphical image 60. The light transmitted by the optoelectrical mirror 120 to the windshield 56 is referred to as a projected light 124.

It should be understood that in order to adjust a total light intensity of the projected light 124, the VGP 58 may include more or less than three light source modules without departing from the scope of the present disclosure.

Referring to FIG. 7, another exemplary embodiment of the VGP 58 includes the first light source module 92a, the second light source module 92b, the third light source module 92c, a first dichroic mirror 126a, a second dichroic mirror 126b, a third dichroic mirror 126c, and the output module 96. The description of the first light source module 92a, the second light source module 92b, the third light source module 92c, and the output module 96 given above in reference to FIG. 6 also applies to the corresponding elements in FIG. 7. Instead of the fiber-optic cables 98a, 98b, 98c, 98d and the fiber-optic coupler 94, the VGP 58 of the exemplary embodiment shown in FIG. 7 utilizes the first dichroic mirror 126a, the second dichroic mirror 126b, and the third dichroic mirror 126c to combine the narrow-beam light 110 from each of the first light source module 92a, the second light source module 92b, and the third light source module 92c.

In the scope of the present disclosure, a dichroic mirror is a mirror which reflects light of a predetermined wavelength and transmits light of other wavelengths. In an exemplary embodiment, the first dichroic mirror 126a, the second dichroic mirror 126b, and the third dichroic mirror 126c include a substrate material (e.g., glass, quartz) coated in a plurality of dielectric layers. Each of the plurality of dielectric layers is selected to have a particular index of refraction and thickness such that the first dichroic mirror 126a, the second dichroic mirror 126b, and the third dichroic mirror 126c reflect light of particular wavelengths and transmit light of other wavelengths.

In a non-limiting example, the first light source module 92a produces narrow-beam light 110 having a wavelength of 380 nanometers. The second light source module 92b produces narrow-beam light 110 having a wavelength of 405 nanometers. The third light source module 92c produces narrow-beam light 110 having a wavelength of 460 nanometers. Accordingly, the first dichroic mirror 126a is configured to reflect narrow-beam light 110 having a wavelength of 380 nanometers and transmit all other wavelengths of light. The second dichroic mirror 126b is configured to reflect narrow-beam light 110 having a wavelength of 405 nanometers and transmit all other wavelengths of light. The third dichroic mirror 126c is configured to reflect narrow-beam light 110 having a wavelength of 460 nanometers and transmit all other wavelengths of light. It should be understood that the aforementioned wavelengths are merely exemplary in nature.

The first dichroic mirror 126*a* is positioned such that narrow-beam light 110 from the first light source module 92*a* reflected by the first dichroic mirror 126*a* is incident upon the second dichroic mirror 126*b*. The second dichroic mirror 126*b* is positioned such that narrow-beam light 110 from the second light source module 92*b* reflected by the second dichroic mirror 126*b* is incident upon the third dichroic mirror 126*c*. The third dichroic mirror 126*c* is positioned such that narrow-beam light 110 from the third light source module 92*c* reflected by the third dichroic mirror 126*c* is incident upon the output module 96. In an exemplary embodiment, each of the first dichroic mirror 126*a*, the second dichroic mirror 126*b*, and the third dichroic mirror 126*c* are positioned at a 45-degree angle to an angle of incidence of the narrow-beam light 110 and aligned along a center axis, as depicted in FIG. 7.

Therefore, the narrow-beam light 110 with a wavelength of 380 nanometers from the first light source module 92*a* is reflected by the first dichroic mirror 126*a* and incident upon the second dichroic mirror 126*b*, as indicated by a first line 128*a*. The narrow-beam light 110 with a wavelength of 380 nanometers from the first light source module 92*a* is transmitted by the second dichroic mirror 126*b* and is incident upon the third dichroic mirror 126*c*, as indicated by a second line 128*b*. The narrow-beam light 110 with a wavelength of 405 nanometers from the second light source module 92*b* is reflected by the second dichroic mirror 126*b* and is incident upon the third dichroic mirror 126*c*, as indicated by the second line 128*b*. Therefore, both the narrow-beam light 110 with a wavelength of 380 nanometers from the first light source module 92*a* and the narrow-beam light 110 with a wavelength of 405 nanometers from the second light source module 92*b* are incident upon the third dichroic mirror 126*c* as indicated by the second line 128*b*. The narrow-beam light 110 with a wavelength of 380 nanometers from the first light source module 92*a* and the narrow-beam light 110 with a wavelength of 405 nanometers from the second light source module 92*b* are transmitted by the third dichroic mirror 126*c* and are incident upon the output module 96, as indicated by a third line 128*c*. The narrow-beam light 110 with a wavelength of 460 nanometers from the third light source module 92*c* is reflected by the third dichroic mirror 126*c* and is incident upon the output module 96, as indicated by the third line 128*c*. Therefore, the narrow-beam light 110 with a wavelength of 380 nanometers from the first light source module 92*a*, the narrow-beam light 110 with a wavelength of 405 nanometers from the second light source module 92*b*, and the narrow-beam light 110 with a wavelength of 460 nanometers from the third light source module 92*c* are incident upon the output module 96 as indicated by the third line 128*c*.

The total narrow-beam light (i.e., the narrow-beam light 110 with a wavelength of 380 nanometers from the first light source module 92*a*, the narrow-beam light 110 with a wavelength of 405 nanometers from the second light source module 92*b*, and the narrow-beam light 110 with a wavelength of 460 nanometers from the third light source module 92*c*) incident upon the output module 96 is collimated by the optical collimator 118 and directed by the optoelectrical mirror 120 as discussed above.

Referring again to FIG. 3, the vehicle controller 34 includes a VGP engine 130. The VGP engine 130 includes a programmable processor including programming to monitor various inputs and determine what information is appropriate to display. The VGP engine 130 can communication directly with various systems and components, or the VGP engine 130 can alternatively or additionally communicate over a LAN/CAN system. The VGP engine 130 utilizes information regarding the operational environment of the vehicle 10 derived from a number of inputs. The various sensing devices 40*a*-40*n* collect and provide information. The sensing devices 40*a*-40*n* include a camera or image capturing device taking periodic or sequential images representing a view from the vehicle 10. The windshield 56 is equipped with features capable of displaying an image projected thereupon while remaining transparent or substantially transparent such that occupants of the vehicle 10 can clearly observe outside of the vehicle 10 through the windshield 56.

The processor of the VGP engine 130 includes a non-transitory computer readable storage device or media. The processor may be a custom made or commercially available processor, a central processing unit (CPU), a graphics processing unit (GPU), an auxiliary processor among several processors associated with the VGP engine 130, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the VGP engine 130 to control various systems of the vehicle 10. The VGP engine 130 may also consist of multiple controllers which are in electrical communication with each other. The VGP engine 130 may be inter-connected with additional systems and/or controllers of the vehicle 10, allowing the VGP engine 130 to access data such as, for example, speed, acceleration, braking, and steering angle of the vehicle 10.

The VGP engine 130 is in electrical communication, via the vehicle controller 34, with the plurality of sensing devices 40*a*-40*n*. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the VGP engine 130 are within the scope of the present disclosure.

The VGP 58, like the DLP 50, projects light to excite the light emitting material 90 (transparent phosphors) within the substrate 84 on the windshield 56 in a predetermined pattern to produce the second graphical image 60 on the windshield 56. In an exemplary embodiment, both the DLP 50 and the VGP 58 are disposed proximally to the headliner of the vehicle 10. In a non-limiting example, the 380 nanometer light of the projected light 124 excites red transparent phosphors. The 405 nanometer light of the projected light 124 excites blue transparent phosphors. The 460 nanometer light of the projected light 124 excites green transparent phosphors. It should be understood that in some embodiments, the transparent phosphors may be excited by other wavelengths of excitation light. Either the DLP 50 or the VGP 58 may be configured to produce any wavelengths of excitation light required to excite the transparent phosphors.

Figure 8:
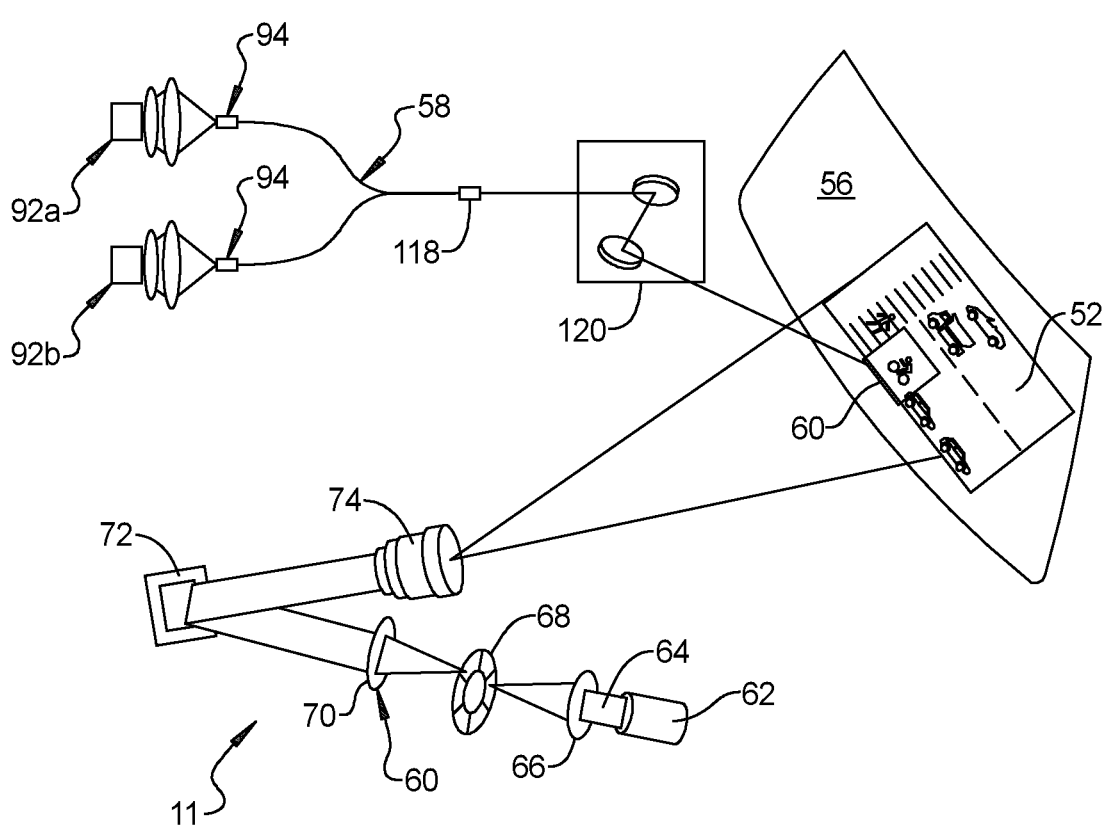
FIG. 8 is a schematic diagram of a system according to an exemplary embodiment, wherein a second graphical image from a vector graphic projector is displayed over a first graphical image from a digital light projector.

In an exemplary embodiment, the vehicle controller 34 uses the system 11 to display graphics indicating conditions of the vehicle 10 and/or the environment surrounding the vehicle 10 detected by the plurality of sensing devices 40a-40n. In an exemplary embodiment, the vehicle controller 34 uses the DLP 50 to display the first graphical image 52, which may include two-dimensional and three-dimensional depictions of the environment surrounding the vehicle 10, or images with vehicle information or infotainment content overlayed "on top" of the occupant's view of the environment outside the vehicle 10. The DLP is capable of providing the first graphical image across the entire windshield 56. Further, the vehicle controller 34 uses the VGP 58 to display the second graphical image 60, which may include rapid response alerts to critical safety conditions detected by the sensor system 28 of the vehicle 10. The VGP 58 is not capable of displaying three-dimensional graphic imagery, however, the VGP 58 is capable of providing instantaneous and brighter alerts by providing augmentation graphics, such as highlighting a pedestrian or a point of interest. Referring to FIG. 1, the second graphical image 60 may be displayed adjacent to the first graphical image 52, such as the arrow meant to draw the occupant's attention to the left. Alternatively, referring to FIG. 8, the second graphical image 60, may be overlayed onto the first graphical image 52, such as the highlighted box around the cyclist in FIG. 8.

Based upon the output of the occupant monitoring system 78 and input data tracking location information regarding the environment around the vehicle 10, the DLP engine 76 can accurately position the first graphical image 52 such that the occupant sees the first graphical image 52 overlaid with visual images through the windshield 56. Further, the VGP engine 130 can accurately position the second graphical image 60 relative to the first graphical image 52, such that the occupant sees the second graphical image 60 at the proper position in proximity to or overlaid upon the first graphical image 52.

In another exemplary embodiment, the second graphical image includes at least one vehicle tell-tale. Vehicle tell-tales can convey different kinds of information. One type of vehicle tell-tale lights or blinks to indicate a failure (as of oil pressure, engine temperature control, charging current, etc.), wherein lighting and blinking indicate progression from warning to failure indication. Another type lights to alert the need for specific service after a certain amount of time or distance has elapsed (e.g., to change the oil). The hybrid projector system 11 includes a calibration system adapted to test and calibrate a displayed tell-tale that is projected within the second graphical image. Referring to FIG. 2, when displaying a vehicle tell-tale, the vector graphic projector displays the second graphical image including the vehicle tell-tale at a position low on the windshield.

Figure 9:
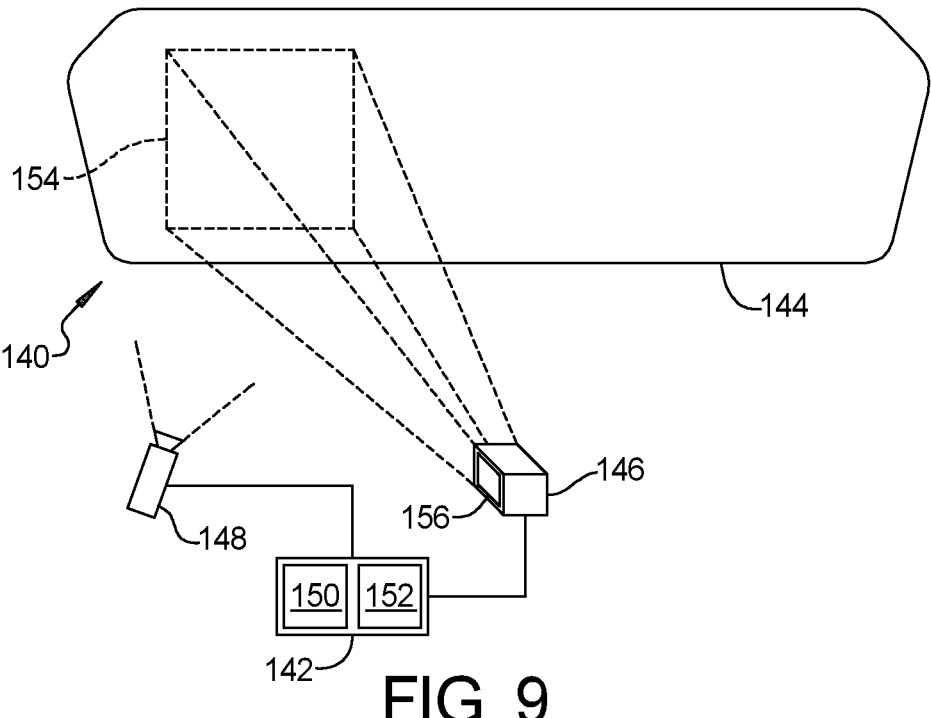
FIG. 9 is a schematic diagram of a reference calibration system, according to an exemplary embodiment.

Referring to FIG. 9, a reference calibration system 140 is illustrated and generally includes a reference controller 142, a reference windshield 144, a reference vector graphics projector 146, and a reference camera 148.

The reference controller 142 is used to implement a method 200 for calibrating a display for a vehicle, as will be described below. The reference controller 142 includes at least one processor 150 and a non-transitory computer readable storage device or media 152. The processor 150 may be a custom made or commercially available processor, a central processing unit (CPU), a graphics processing unit (GPU), an auxiliary processor among several processors associated with the reference controller 142, a semiconductor-based microprocessor (in the form of a microchip or chip set), a macroprocessor, a combination thereof, or generally a device for executing instructions. The computer readable storage device or media 152 may include volatile and nonvolatile storage in read-only memory (ROM), random-access memory (RAM), and keep-alive memory (KAM), for example. KAM is a persistent or non-volatile memory that may be used to store various operating variables while the processor 150 is powered down. The computer-readable storage device or media 152 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the reference controller 142 to control the system 140. The reference controller 142 may also consist of multiple controllers which are in electrical communication with each other. In a non-limiting example, the reference controller 142 includes or is integrated in a computer system, such as, for example, a server computer, a workstation computer, a personal computer, and/or the like.

The reference controller 142 is in electrical communication with the reference vector graphics projector 146 and the reference camera 148. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the reference controller 12 are within the scope of the present disclosure.

The reference windshield 144 is used to provide a reference projection surface for the system 140. In an exemplary embodiment, the reference windshield 144 is selected such that a plurality of variable characteristics of the reference windshield 144 are within a predetermined range for each of the plurality of variable characteristics. In the scope of the present disclosure, the plurality of variable characteristics includes characteristics of the reference windshield 144 which may be affected by manufacturing variation, such as, for example, curvature, glass thickness uniformity, glass surface quality, glass coating uniformity, and/or the like. In an exemplary embodiment, the predetermined range for each of the plurality of variable characteristics is determined based at least in part on a statistical analysis of a plurality of windscreens. In a non-limiting example, the predetermined range for each of the plurality of variable characteristics is plus or minus one standard deviation from the average value of each of the plurality of variable characteristics. Therefore, the reference windshield 144 is selected such that the reference windshield 144 is a statistically accurate approximation of a typical windscreen.

The reference windshield 144 includes transparent phosphors (not shown) embedded into the reference windshield 144. As described above, with reference to the windshield 56 of the vehicle 10, the transparent phosphors are light emitting particles which fluoresce in response to being excited by the reference vector graphics projector 146. In an exemplary embodiment, the transparent phosphors are red, green, and blue (RGB) phosphors. The use of monochrome and/or two-color phosphors is also within the scope of the present disclosure. When excitation light is absorbed by the transparent phosphors, visible light is emitted by the transparent phosphors. The excitation light is provided by the reference vector graphics projector 146.

The reference vector graphics projector 146 is used to excite the transparent phosphors in a predetermined pattern to produce the vector graphics on the reference windshield 144. In a first exemplary embodiment, the reference vector graphics projector 146 is a violet/ultraviolet laser projector disposed proximally to the headliner of the vehicle 10. In another exemplary embodiment, the reference vector graphics projector 146 is an LED-based projector, as discussed in U.S. application Ser. No. 18/186,343 titled "GRAPHICS PROJECTOR FOR USE IN A VEHICLE" filed on Mar. 20, 2023, the entire contents of which is hereby incorporated by reference. The reference vector graphics projector 146 is configured to selectively excite the red, green, or blue transparent phosphors of the reference windshield 144. The reference vector graphics projector 146 has a field-of-projection 154. In the scope of the present disclosure, the field-of-projection 154 defines an area upon which the reference vector graphics projector 146 is capable of projection. In a non-limiting example, the field-of-projection 154 is defined by pixel width and a pixel height (e.g., 1920×1920 pixels).

The reference vector graphics projector 146 further includes a reference vector graphics projector camera 156. The reference vector graphics projector camera 156 is a photo and/or video camera which views the reference windshield 144 from the perspective of the reference vector graphics projector 146. In an exemplary embodiment, the reference vector graphics projector camera 156 is integrated in the reference vector graphics projector 146, for example, having a lens adjacent to a projection lens of the reference vector graphics projector 146. The reference vector graphics projector 146 is fixedly mounted at a predetermined location and angle relative to the reference windshield 144, such that variation due to installation or mounting of the reference windshield 144 and the reference vector graphics projector 146 is eliminated. The reference vector graphics projector 146 and the reference vector graphics projector camera 156 are in electrical communication with the reference controller 142 as discussed in greater detail above.

The reference camera 148 is used to capture images and/or videos of the reference windshield 144. In an exemplary embodiment, the reference camera 148 is a photo and/or video camera which is positioned to view the reference windshield 144. The reference camera 148 is fixedly mounted at a predetermined location and angle relative to the reference windshield 144. In an exemplary embodiment, the predetermined location of the reference camera 148 is a reference occupant eyellipse location. In the scope of the present disclosure, an occupant eyellipse location represents an eye location and orientation for a typical occupant while sitting in a vehicle seat. Therefore, the reference occupant eyellipse location is a location relative to the reference windshield 144 where the occupant eyellipse would be located if an occupant were to sit in a vehicle seat at a same height, distance, orientation, and angle from the reference windshield 144 as in a vehicle. Accordingly, the reference camera 148 is configured to view the reference windshield 144 from a perspective of an occupant of a vehicle if the reference windshield 144 were installed in said vehicle. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The reference camera 148 is in electrical communication with the reference controller 142 as discussed in greater detail above.

The vehicle vector graphics projector 58 further includes a vehicle vector graphics projector camera 158. The vehicle vector graphics projector camera 158 is a photo and/or video camera which views the vehicle windshield 56 from the perspective of the vehicle vector graphics projector 58. In an exemplary embodiment, the vehicle vector graphics projector camera 158 is integrated in the vehicle vector graphics projector 58, for example, having a lens adjacent to a projection lens of the vehicle vector graphics projector 58. The vehicle vector graphics projector 58 and the vehicle vector graphics projector camera 158 are in electrical communication with the vehicle controller 34 as discussed in greater detail above.

In an exemplary embodiment, the vehicle controller 34 uses the vehicle vector graphics projector 58 to display second graphical images 60 including vehicle tell-tales. In a non-limiting example, the vehicle vector graphics projector 58 is used as a primary instrument to display information such as, for example, vehicle speed, coolant temperature, fuel level, state of charge, and/or the like, as well as vehicle tell-tales. In an exemplary embodiment, the second graphical images 60 are calibrated before display such that distortion of the second graphical images 60 caused by various characteristics is mitigated, as will be discussed in greater detail below in reference to the method 200. Use of the vector graphics projector 58 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

Figure 10:
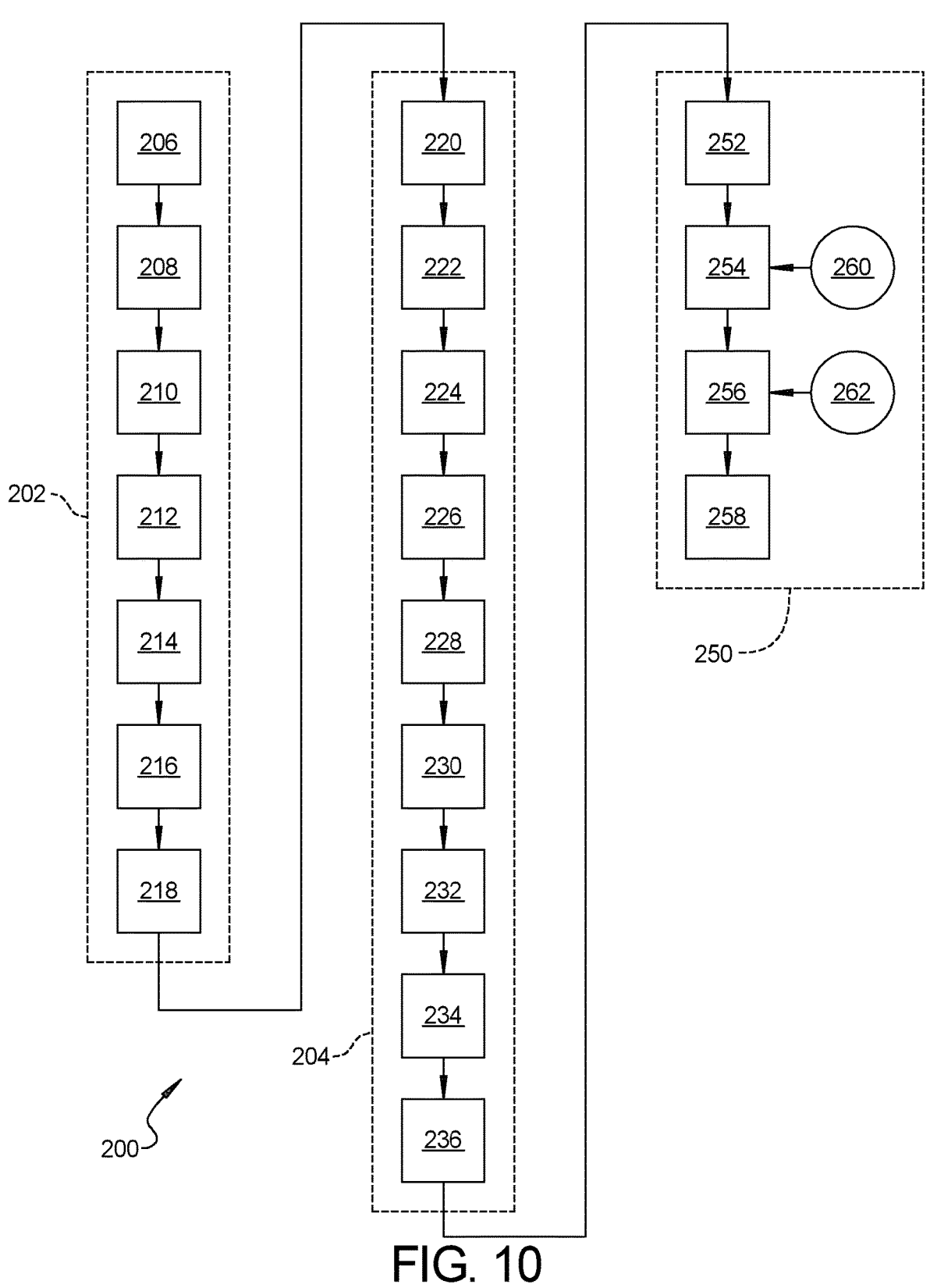
FIG. 10 is a flow chart illustrating a method according to an exemplary embodiment of the present disclosure.

Referring to FIG. 10, a method 200 of displaying graphics with a hybrid projector system 11 for a head up display within a vehicle, includes, beginning at block 202, projecting, with a digital light projector 50, a first graphical image 52 onto an inner surface 54 of a windshield 56 of the vehicle 10, and, moving to block 204, projecting, with a vector graphics projector 58, a second graphical image 60 onto the inner surface 54 of the windshield 56 of the vehicle 10. Moving to block 250, the method 200 includes testing and calibrating, with a calibration system, a displayed vehicle tell-tale within the second graphical image 60.

In an exemplary embodiment, the projecting, with a digital light projector 50, a first graphical image 52 onto an inner surface 54 of a windshield 56 of the vehicle 10, at block 202, further includes, moving to block 206, projecting, with a light source 62, an excitation light 64, moving to block 208, focusing, with a condensing lens 66, the excitation light 64 from the light source 62, and moving to block 210, splitting, with a color filter 68, the focused excitation light 64 into red, green and blue light, and moving to block 212, focusing, with a shaping lens 70, the excitation light 64 passing through the color filter 68, and moving to block 214, re-directing, with a digital micro-mirror device (DMD) 72, the excitation light 64, and moving to block 216, receiving, with a projection lens 74, the excitation light 64 from the digital micro-mirror device 72 and, moving to block 218, projecting, with the projection lens 74, the excitation light 64 to the inner surface 54 of the windshield 56.

In an exemplary embodiment, the projecting, with a vector graphics projector 58, a second graphical image 60 onto the inner surface 54 of the windshield 56 of the vehicle 10, at block 204, further includes, moving to block 220, producing, with a light-emitting diode (LED) array 100 of a light source module 92a, a source light 106, and moving to block 222, receiving, with an optical bandpass filter 102 of the light source module 92a in optical communication with the LED array 100, the source light 106, and, moving to block 224, filtering, with the optical bandpass filter 102, the source light 106, and moving to block 226, transmitting, through the optical bandpass filter 102, filtered light 108 having a wavelength within a passband of the optical bandpass filter 102, and moving to block 228, receiving, with a focusing lens 104 of the light source module 92*a* in optical communication with the optical filter 102, the filtered light 108, and moving to block 230, transmitting, with the focusing lens 104, a narrow-beam light 110, and moving to block 232, receiving, with an optical collimator 118 in optical communication with the light source module 92*a*, the narrow-beam light 110, and moving to block 234, transmitting, with the optical collimator 118, a collimated light 122, and moving to block 236, directing, with an optoelectrical mirror 120 in optical communication with the optical collimator 118, the collimated light 122 to form a graphic.

In another exemplary embodiment, the projecting, with a vector graphics projector 58, a second graphical image 60 onto the inner surface 54 of the windshield 56 of the vehicle 10, at block 202, further includes projecting, with a plurality of light source modules 92*a*, 92*b*, 92*c* in optical communication with the optical collimator 118 of the vector graphics projector 58, a second graphical image 60 onto the inner surface 54 of the windshield 56 of the vehicle 10.

In another exemplary embodiment, the transmitting, with the focusing lens, a narrow-beam light at block 230 further incudes transmitting, with a fiber-optic cable waveguide 98*a*, 98*b*, 98*c*, 98*d* in optical communication with the plurality of light source modules 92*a*, 92*b*, 92*c* and the optical collimator 118, the narrow-beam light 110 from each of the plurality of light source modules 92*a*, 92*b*, 92*c* to the optical collimator 118.

In another exemplary embodiment, the transmitting, with the focusing lens 104, a narrow-beam light 110 at block 230 further incudes transmitting, with a plurality of dichroic mirrors 126*a*, 126*b*, 126*c*, wherein each of the plurality of dichroic mirrors 126*a*, 126*b*, 126*c*, is in optical communication with one of the plurality of light source modules 92*a*, 92*b*, 92*c*, the narrow-beam light 110 from each of the plurality of light source modules 92*a*, 92*b*, 92*c*, to the optical collimator 118, wherein each of the plurality of dichroic mirrors 126*a*, 126*b*, 126*c*, is configured to reflect a predetermined wavelength of the narrow-beam light 110 and transmit all other wavelengths of the narrow-beam light 110.

In another exemplary embodiment, the transmitting, with the focusing lens 104, a narrow-beam light 110 at block 230 further includes transmitting, with the focusing lens 104 of a first one of the plurality of light source modules 92*a*, a narrow-beam light 110 having a wavelength of 380 nanometers, transmitting, with the focusing lens 104 of a second one of the plurality of light source modules 92*b*, a narrow-beam light 110 having a wavelength of 405 nanometers, and transmitting, with the focusing lens 104 of a third one of the plurality of light source modules 92*c*, a narrow-beam light 110 having a wavelength of 460 nanometers.

In an exemplary embodiment, the testing and calibrating, with a calibration system 140, a displayed vehicle tell-tale within the second graphical image 60 at block 250, further includes, moving to block 252, the calibration system 140 is used to calculate at least one reference calibration matrix, as will be discussed in greater detail below. After block 252, the method 200 proceeds to block 254. At block 254, the system 11 is used to calculate a vehicle vector graphics calibration matrix, as will be discussed in greater detail below. After block 254, the method 200 proceeds to block 256.

At block 256, the system 11 is used to display a graphic based at least in part on the vehicle vector graphics calibration matrix calculated at block 254. In an exemplary embodiment, the vehicle controller 34 identifies an object of interest as discussed above and determines a graphic to display using the vector graphics projector 58. In a non-limiting example, the object of interest is an obstacle on a roadway in the environment surrounding the vehicle 10 and the graphic is an animated warning indication including multiple video frames displayed in succession. To display each frame of the animated warning indication, the vehicle controller 34 applies the vehicle vector graphics calibration matrix calculated at block 254 to each frame of the animated warning indication. In a non-limiting example, to apply the vehicle TWD calibration matrix, the vehicle controller 34 adds the vehicle vector graphics calibration matrix to a matrix defining each frame of the animated warning indication before projecting each frame of the animated warning indication using the vehicle vector graphics projector 58. Therefore, each frame of the animated warning indication is compensated for distortion. After block 256, the method 200 proceeds to enter a standby state at block 258. It should be understood that the method 200 may be repeated for additional areas (i.e., additional fields-of-projection 154) of the reference windshield 144 and/or the vehicle windshield 56 to compensate and display graphics on an entire windshield surface.

It should be understood that the method 200 may periodically exit the standby state 258 and repeat some or all of the method steps. In an exemplary embodiment, the method 200 includes a first reentry point 260 and a second reentry point 262 from which the method 200 may begin in certain conditions. In an exemplary embodiment, the first reentry point 260 is used if parts of the system 11 are replaced. In a non-limiting example, if the vehicle windshield 56 and/or the vehicle vector graphics projector 58 are replaced, it is necessary to re-calculate the vehicle vector graphics calibration matrix at block 254. Therefore, the first reentry point 260 of the method 200 is used. For example, the method 200 may be initiated to begin at the first reentry point 260 by a service technician after replacing the vehicle windshield 56 and/or the vehicle vector graphics projector 58. In an exemplary embodiment, the second reentry point 262 is used in normal operation of the system 11 to display compensated graphics. In a non-limiting example, the method 200 exits the standby state 258 and reenters the method 200 at the second reentry point 262 on a timer, for example, every three hundred milliseconds.

Figure 11:
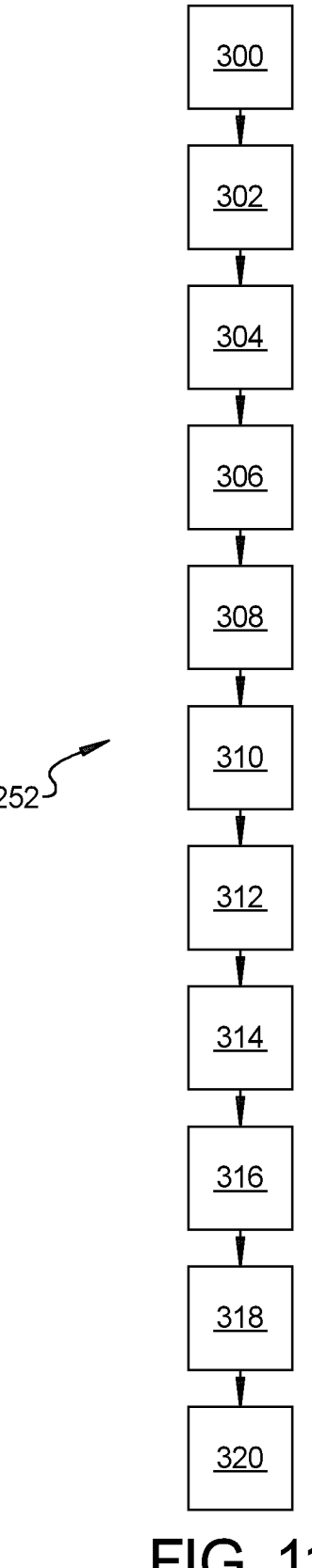
FIG. 11 is a flowchart of an exemplary embodiment of a method for calculating at least one reference calibration matrix, according to an exemplary embodiment.
Figure 12A:
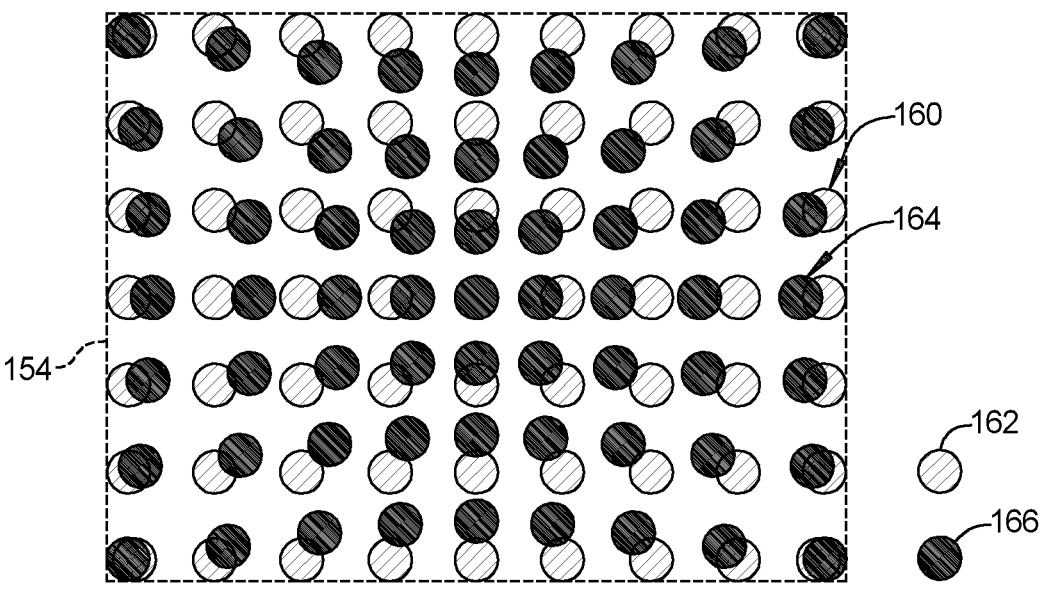
FIG. 12A is a first exemplary view of a field of projection of the reference calibration system, according to an exemplary embodiment.

Referring to FIG. 11, a flowchart of an exemplary embodiment of block 252 is shown. Referring also to FIG. 12A, a first exemplary view of the field-of-projection 154 of the system 11 is shown. The exemplary embodiment of block 252 begins at block 300. At block 300, the reference controller 142 uses the reference vector graphics projector 146 to project a reference graphic 160 on the reference windshield 144. In the scope of the present disclosure, the reference graphic 160 includes a plurality of projected dots 162 arranged in a uniform two-dimensional array or grid (i.e., a distance between each dot and the surrounding dots is consistent). Each of the plurality of projected dots 162 has an intended x-coordinate and an intended y-coordinate defined relative to the field-of-projection 154. The reference graphic 160 is represented as an intended reference graphic matrix. In the scope of the present disclosure, the intended reference graphic matrix is a two-dimensional matrix having a plurality of elements. Each of the plurality of elements of the intended reference graphic matrix defines a location of one of the plurality of projected dots 162 by storing the intended x-coordinate and the intended y-coordinate of the one of the plurality of projected dots 162. For the exemplary reference graphic 160 shown in FIG. 12A, the intended reference graphic matrix is:

$$I = \begin{bmatrix} x_1, y_1 & \cdots & x_9, y_1 \\ \vdots & & \vdots \\ x_1, y_7 & \cdots & x_9, y_7 \end{bmatrix} \qquad (1)$$

wherein I is the intended reference graphic matrix, $x\_n$ is the intended x-coordinate of one of the plurality of projected dots 162 located in column n of the intended reference graphic matrix, and $y\_m$ is the intended y-coordinate of one of the plurality of projected dots 162 located in row m of the intended reference graphic matrix. It should be understood that the reference graphic 160 may have any number of dots and the intended reference graphic matrix may have any number of rows and/or columns without departing from the scope of the present disclosure. After block 300, the exemplary embodiment of block 252 proceeds to block 302.

At block 302, the reference controller 142 uses the reference camera 148 to capture a first reference image 164 of the reference graphic 160 on the reference windshield 144. Due to manufacturing variation (e.g., curvature variation, glass thickness uniformity variation, glass surface quality variation, glass coating uniformity variation, and/or the like) of the reference windshield 144, the reference graphic 160 appears distorted in the first reference image 164. In other words, the location of each of the plurality of projected dots 162 of the reference graphic 160 does not correspond with the location of each of a plurality of perceived dots 166 in the first reference image 164, as shown in FIG. 12A. In the scope of the present disclosure, perceived dots 166 refer to dots as they are perceived by one of the reference camera 148, the reference vector graphics camera 156, or the vehicle vector graphics camera 158. After block 302, the exemplary embodiment of block 252 proceeds to block 304.

At block 304, the reference controller 142 identifies the plurality of perceived dots 166 in the first reference image 164 captured at block 302. In an exemplary embodiment, the reference controller 142 uses a computer vision algorithm to identify the plurality of perceived dots 166 in the first reference image 164. In the scope of the present disclosure, identifying the plurality of perceived dots 166 means that the reference controller 142 isolates the plurality of perceived dots 166 from other elements in the first reference image 164 (e.g., background objects, dust particles, camera artifacts, and/or the like) such that a location of each of the plurality of perceived dots 166 may be determined, as discussed below. In an exemplary embodiment, the computer vision algorithm is trained by providing the computer vision algorithm with a plurality of images including dots at various positions and angles. After sufficient training of the computer vision algorithm, the reference controller 142 can identify the plurality of perceived dots 166 in the first reference image 164 with a high degree of accuracy and precision. After identifying the plurality of perceived dots 166 in the first reference image 164, the reference controller 142 determines an actual x-coordinate and an actual y-coordinate of each of the plurality of perceived dots 166 in the first reference image 164. In an exemplary embodiment, the actual coordinates of each of the plurality of perceived dots 166 in the first reference image 164 are identified by performing pixel measurements to each of the plurality of perceived dots 166 relative to the field-of-projection 154 in the first reference image 164. After block 304, the exemplary embodiment of block 252 proceeds to block 306.

At block 306, the reference controller 142 generates an actual reference graphic matrix. In the scope of the present disclosure, the actual reference graphic matrix contains the actual x-coordinate and the actual y-coordinate of each of the plurality of perceived dots 66 in the first reference image 164, as determined at block 304. After block 306, the exemplary embodiment of block 252 proceeds to block 308.

At block 308, the reference controller 142 calculates a reference camera deviation matrix. In the scope of the present disclosure, the reference camera deviation matrix encodes differences between the reference graphic 160 and the first reference image 164. In an exemplary embodiment, to calculate the reference camera deviation matrix, the actual reference graphic matrix generated at block 306 is subtracted from the intended reference graphic matrix. After block 308, the exemplary embodiment of block 252 proceeds to block 310.

At block 310, the reference controller 142 generates a deviation-compensated reference graphic matrix by summing the intended reference graphic matrix with the reference camera deviation matrix determined at block 308. After block 310, the exemplary embodiment of block 252 proceeds to block 312.

Figure 12B:
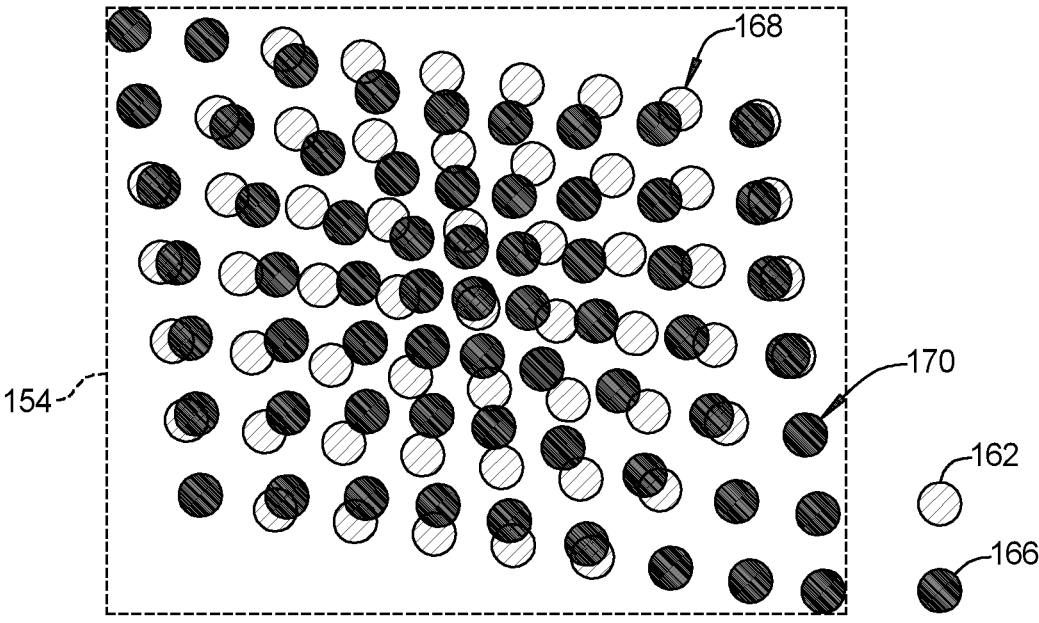
FIG. 12B is a second exemplary view of a field of projection of the reference calibration system, according to an exemplary embodiment.

Referring to FIG. 12B, a second exemplary view of the field-of-projection 154 of the system 11 is shown. With continued reference to FIGS. 11, 12A and 12B, at block 312, the reference controller 142 uses the reference vector graphics projector 146 to project a deviation-compensated reference graphic 168 on the reference windshield 144. The location of each of the plurality of projected dots 162 of the deviation-compensated reference graphic is defined by the deviation-compensated reference graphic matrix generated at block 310. After block 312, the exemplary embodiment of block 252 proceeds to block 314.

At block 314, the reference controller 14 uses the reference vector graphics projector camera 156 to capture a second reference image 170 of the deviation-compensated reference graphic 168 on the reference windshield 144. Due to the predetermined location and angle of the reference vector graphics projector camera 156 relative to the reference windshield 144, the deviation-compensated reference graphic 168 appears distorted in the second reference image 170. In other words, the location of each of the plurality of projected dots 162 of the deviation-compensated reference graphic 168 does not correspond with the location of each of a plurality of perceived dots 166 in the second reference image 170, as shown in FIG. 12B. After block 314, the exemplary embodiment of block 252 proceeds to block 316.

At block 316, the reference controller 142 identifies the plurality of perceived dots 166 in the second reference image 170 captured at block 314. In an exemplary embodiment, the reference controller 142 uses a computer vision algorithm to identify the plurality of perceived dots 166 in the second reference image 170. In the scope of the present disclosure, identifying the plurality of perceived dots 166 means that the reference controller 142 isolates the plurality of perceived dots 166 from other elements in the second reference image 170 (e.g., background objects, dust particles, camera artifacts, and/or the like) such that a location of each of the plurality of perceived dots 166 may be determined, as discussed below. In an exemplary embodiment, the computer vision algorithm is trained by providing the computer vision algorithm with a plurality of images including dots at various positions and angles. After sufficient training of the computer vision algorithm, the reference controller 142 can identify the plurality of perceived dots 166 in the second reference image 170 with a high degree of accuracy and precision. After identifying the plurality of perceived dots 166 in the second reference image 170, the reference controller 142 determines an actual x-coordinate and an actual y-coordinate of each of the plurality of perceived dots 66 in the second reference image 170. In an exemplary embodiment, the actual coordinates of each of the plurality of perceived dots 166 in the second reference image 170 are identified by performing pixel measurements to each of the plurality of perceived dots 166 relative to the field-of-projection 154 in the second reference image 170. After block 316, the exemplary embodiment of block 252 proceeds to block 318.

At block 318, the reference controller 142 generates a reference vector graphics projector camera matrix. In the scope of the present disclosure, the reference vector graphics projector camera matrix contains the actual x-coordinate and the actual y-coordinate of each of the plurality of perceived dots 166 in the second reference image 170, as determined at block 316. The reference vector graphics projector camera matrix is also referred to as a type of reference calibration matrix. After block 318, the exemplary embodiment of block 252 proceeds to block 320.

At block 320, the reference controller 142 determines a reference vector graphics projector camera transformation matrix. In the scope of the present disclosure, the reference vector graphics projector camera transformation matrix defines a perspective transformation between the perspective of the reference camera 148 and the perspective of the reference vector graphics projector camera 156. The reference vector graphics projector camera transformation matrix is also referred to as a type of reference calibration matrix. In an exemplary embodiment, to determine the reference vector graphics projector camera transformation matrix, the reference vector graphics projector camera matrix determined at block 318 is subtracted from the reference camera deviation matrix determined at block 308. After block 320, the exemplary embodiment of block 252 is concluded, and the method 200 proceeds as discussed above.

Figure 13:
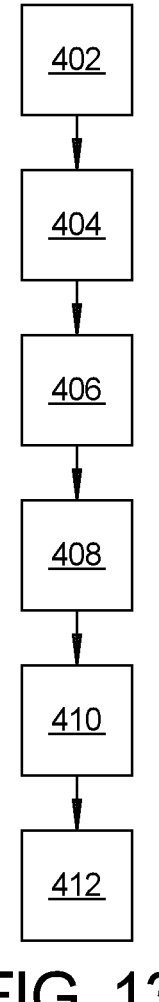
FIG. 13 is a flowchart of an exemplary embodiment of a method calculate a vehicle TWD calibration matrix, according to an exemplary embodiment.

Referring to FIG. 13, a flowchart of an exemplary embodiment of block 254 is shown. The exemplary embodiment of block 254 begins at block 402. At block 402, the vehicle controller 34 uses the vehicle vector graphics projector 58 to project the reference graphic 160 on the vehicle windshield 56. After block 402, the exemplary embodiment of block 254 proceeds to block 404.

At block 404, the vehicle controller 34 uses the vehicle vector graphics projector camera 158 to capture a calibration image of the reference graphic 160 on the vehicle windshield 56. Due to manufacturing variation (e.g., curvature variation, glass thickness uniformity variation, glass surface quality variation, glass coating uniformity variation, and/or the like) of the vehicle windshield 56 and the location and angle of the vehicle vector graphics projector 58 relative to the vehicle windshield 56, the reference graphic 160 appears distorted in the calibration image. The calibration image is substantially similar to the second reference image 170 discussed above in reference to FIG. 13B. However, the distortion of the reference graphic 160 in the calibration image may be different from the distortion of the reference graphic 160 in the second reference image 170 because of differing manufacturing variation between the reference windshield 144 and the vehicle windshield 56. Additionally, variation in mounting (i.e., position and angle) of the vehicle windshield 56 and the vehicle vector graphics projector 58 relative to the position and angle of the reference windshield 144 and the reference vector graphics projector 146 may also introduce distortion which is not present in the second reference image 170. After block 404, the exemplary embodiment of block 254 proceeds to block 406.

At block 406, the vehicle controller 34 identifies a plurality of perceived dots in the calibration image captured at block 404. In the scope of the present disclosure, identifying the plurality of perceived dots means that the vehicle controller 34 isolates the plurality of perceived dots from other elements in the calibration image (e.g., background objects, dust particles, camera artifacts, and/or the like) such that a location of each of the plurality of perceived dots may be determined, as discussed below. In an exemplary embodiment, the vehicle controller 34 uses a computer vision algorithm to identify the plurality of perceived dots in the calibration image. In an exemplary embodiment, the computer vision algorithm is trained by providing the computer vision algorithm with a plurality of images including dots at various positions and angles. After sufficient training of the computer vision algorithm, the vehicle controller 34 can identify the plurality of perceived dots in the calibration image with a high degree of accuracy and precision. After identifying the plurality of perceived dots in the calibration image, the vehicle controller 34 determines an actual x-coordinate and an actual y-coordinate of each of the plurality of perceived dots in the calibration image. In an exemplary embodiment, the actual coordinates of each of the plurality of perceived dots in the calibration image are identified by performing pixel measurements to each of the plurality of perceived dots relative to the field-of-projection 26 in the calibration image. After block 406, the exemplary embodiment of block 254 proceeds to block 408.

At block 408, the vehicle controller 34 generates an actual vehicle vector graphics matrix. In the scope of the present disclosure, the actual vehicle vector graphics matrix contains the actual x-coordinate and the actual y-coordinate of each of the plurality of perceived dots in the calibration image, as determined at block 406. After block 408, the exemplary embodiment of block 254 proceeds to block 410.

At block 410, the vehicle controller 34 calculates a vehicle vector graphics deviation matrix. In the scope of the present disclosure, the vehicle vector graphics deviation matrix encodes differences between the reference graphic 160 and the calibration image from the perspective of the vehicle vector graphics projector camera 158. In an exemplary embodiment, to calculate the vehicle vector graphics deviation matrix, the actual vehicle vector graphics matrix generated at block 408 is subtracted from the reference vector graphics camera matrix generated at block 318. After block 410, the exemplary embodiment of block 254 proceeds to block 412.

At block 412, the vehicle controller 34 calculates the vehicle vector graphics calibration matrix. In the scope of the present disclosure, the vehicle vector graphics calibration matrix is a 2-dimensional matrix which, when added to a matrix defining a graphic, compensates for distortion introduced by manufacturing variation and mounting variation of the vehicle windshield 56 and the vehicle vector graphics projector 58. Therefore, the compensated graphic does not appear distorted to an occupant from the perspective of an occupant eyellipse of the vehicle 10. In an exemplary embodiment, to calculate the vehicle vector graphics calibration matrix, the vehicle vector graphics deviation matrix calculated at block 410 is subtracted from the reference vector graphics camera transformation matrix calculated at block 320. After block 412, the exemplary embodiment of block 254 is concluded and the method 200 proceeds as discussed above.

It should be understood that the vehicle TWD calibration matrix may be expanded (e.g., using mathematical interpolation and/or extrapolation) to include values corresponding to each pixel of the field-of-projection 154 without departing from the scope of the present disclosure. Furthermore, it should be understood that the system 11 and the calibration system 140 may be used together, and that a system for calibrating a display for a vehicle can be understood to include both.

The system 11 and method 200 of the present disclosure offer several advantages. Using the reference calibration system 140 and the method 200, the reference calibration matrices may be generated in a test environment, and may be applied to the system 11 during production of vehicles. Thus, use of the method 200 mitigates the need for complex and/or time-consuming calibration of the system 11 during vehicle production, and allows for an automatic self-calibration of the system 11. Furthermore, use of the method 200 allows for re-calibration of the system 11 by a service technician without the need for specialized tools or equipment. Further, the system 11 provides for self testing and calibration of second graphical images projected by the vector graphics projector 58, such as vehicle tell-tales, allowing the system 11 to ensure proper display of such vehicle tell-tales. Using vector graphics projector 58 with a plurality of light source modules 92*a*, 92*b*, 92*c*, each of the plurality of light source modules 92*a*, 92*b*, 92*c* may be individually configured to achieve a desired output characteristics (e.g., intensity, wavelength, and the like). Furthermore, each of the plurality of light source modules 92*a*, 92*b*, 92*c* may be adjusted by the VGP engine 130 to adjust an intensity and wavelength composition of the projected light 124 during projection, enabling precise control of the excitation of the transparent phosphors. Furthermore, excitation of the transparent phosphors is achieved using diffuse light sources (i.e., the LED array), reducing cost and complexity and avoiding possible disadvantages of high-powered, concentrated light sources, such as the light source 62 of the DLP 50. These characteristics of the vector graphic projector 58 provide instantaneous response to rapidly display vehicle tell-tales, and to display such vehicle tell-tales brighter than would be possible with digital light processing projectors, thus ensuring that the attention of an occupant within the vehicle will be drawn to displayed vehicle tell-tales.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for a head up display within a vehicle, comprising:
   a vehicle vector graphics projector adapted to project a second graphical image onto an inner surface of a windshield of the vehicle, the second graphical image having a greater brightness than a first graphical image and including at least one vehicle tell-tale; and
   a calibration system adapted to test and calibrate a displayed tell-tale within the second graphical image;
   the calibration system including a reference calibration system comprising:
   a reference windshield;

a reference vector graphics projector, wherein the reference vector graphics projector includes a reference vector graphics projector camera;
   a reference camera; and
   a reference controller in electrical communication with the reference vector graphics projector and the reference camera, wherein the reference controller is programmed to:
   project a reference graphic on the reference windshield using the reference vector graphics projector, wherein the reference graphic is a vehicle tell-tale and includes a plurality of projected dots arranged in a two-dimensional array, and wherein an intended x-coordinate and an intended y-coordinate of each of the plurality of projected dots is defined by an intended reference graphic matrix;
   capture a first reference image of the reference graphic using the reference camera;
   calculate at least one reference calibration matrix based at least in part on the first reference image of the reference graphic;
   identify a plurality of perceived dots of the reference graphic in the first reference image;
   determine an actual x-coordinate and an actual y-coordinate of each of the plurality of perceived dots of the reference graphic in the first reference image;
   generate an actual reference graphic matrix, wherein each element of the actual reference graphic matrix contains the actual x-coordinate and the actual y-coordinate of one of the plurality of perceived dots of the reference graphic in the first reference image;
   calculate a reference camera deviation matrix by subtracting the actual reference graphic matrix from the intended reference graphic matrix, wherein the reference camera deviation matrix encodes deviations in the reference graphic due to characteristics of the reference windshield; and
   determine a reference vector graphics projector camera transformation matrix based at least in part on the reference camera deviation matrix.

2. The system of claim 1, wherein when determining the reference vector graphics projector camera transformation matrix, the reference controller is further programmed to:
   generate a deviation-compensated reference graphic matrix by summing the intended reference graphic matrix and the reference camera deviation matrix;
   project a deviation-compensated reference graphic on the reference windshield using the reference vector graphics projector, wherein a location of each of a plurality of projected dots of the deviation-compensated reference graphic is defined by the deviation-compensated reference graphic matrix;
   capture a second reference image of the deviation-compensated reference graphic using the reference vector graphics projector camera;
   identify a plurality of perceived dots of the deviation-compensated reference graphic in the second reference image;
   determine an actual x-coordinate and an actual y-coordinate of each of the plurality of perceived dots of the deviation-compensated reference graphic in the second reference image;
   generate a reference vector graphics projector camera matrix, wherein each element of the reference vector graphics projector camera matrix contains the actual x-coordinate and the actual y-coordinate of one of the plurality of perceived dots of the deviation-compensated reference graphic in the second reference image; and determine the reference vector graphics projector camera transformation matrix by subtracting the reference vector graphics projector camera matrix from the reference camera deviation matrix.

3. The system of claim 2, wherein:

the vehicle vector graphics projector includes a vehicle vector graphics projector camera; and a hybrid projector system includes a vehicle controller in electrical communication with the vehicle vector graphics projector, wherein the vehicle controller is programmed to:

project the reference graphic on the vehicle windshield using the vehicle vector graphics projector;

capture a calibration image of the reference graphic using the vehicle vector graphics projector camera;

calculate a vehicle vector graphics projector calibration matrix based at least in part on the at least one reference calibration matrix and the calibration image of the reference graphic; and apply the vehicle vector graphics projector calibration matrix to each frame projected using the vehicle vector graphics projector.

4. The system of claim 3, wherein when calculating the vehicle vector graphics projector calibration matrix, the vehicle controller is further programmed to:

determine a vehicle vector graphics projector deviation matrix based at least in part on the at least one reference calibration matrix and the calibration image of the reference graphic; and calculate the vehicle vector graphics projector calibration matrix by subtracting the vehicle vector graphics projector deviation matrix from the reference vector graphics projector camera transformation matrix.

5. The system of claim 4, wherein when determining the vehicle vector graphics projector deviation matrix, the vehicle controller is further programmed to:

identify a plurality of perceived dots of the reference graphic in the calibration image;

determine an actual x-coordinate and an actual y-coordinate of each of the plurality of perceived dots of the reference graphic in the calibration image;

generate an actual vehicle vector graphics projector matrix, wherein each element of the actual vehicle vector graphics projector matrix contains the actual x-coordinate and the actual y-coordinate of one of the plurality of perceived dots of the reference graphic in the calibration image; and calculate the vehicle vector graphics projector deviation matrix by subtracting the actual vehicle vector graphics projector matrix from the reference vector graphics projector camera matrix.

6. The system of claim 1, wherein the reference camera is fixedly mounted at a reference occupant eyellipse location, and wherein the reference occupant eyellipse location is a predetermined location in space relative to the reference windshield.

7. The system of claim 1, wherein the vehicle vector graphics projector includes:

a light source module including:

a light-emitting diode (LED) array configured to produce a source light;

an optical filter in optical communication with the LED array, wherein the optical filter is configured to receive the source light and transmit a filtered light; and a focusing lens in optical communication with the optical filter, wherein the focusing lens is configured to receive the filtered light and transmit a narrow-beam light;

an optical collimator in optical communication with the light source module, wherein the optical collimator is configured to receive the narrow-beam light and transmit a collimated light; and an optoelectrical mirror in optical communication with the optical collimator, wherein the optoelectrical mirror is configured to direct the collimated light to form a graphic.

8. The system of claim 7, wherein the optical filter is an optical bandpass filter configured to filter the source light and transmit the filtered light, wherein the filtered light includes only light having a wavelength within a passband of the optical bandpass filter.

9. The system of claim 8, further comprising a plurality of light source modules in optical communication with the optical collimator.

10. The system of claim 9, further comprising an optical waveguide in optical communication with the plurality of light source modules and the optical collimator, wherein the optical waveguide is configured to transmit the narrow-beam light from each of the plurality of light source modules to the optical collimator.

11. The system of claim 10, wherein the optical waveguide is a fiber-optic cable in optical communication with the focusing lens of each of the plurality of light source modules using a fiber-optic coupler.

12. The system of claim 9, further including a plurality of dichroic mirrors, wherein each of the plurality of dichroic mirrors is in optical communication with one of the plurality of light source modules, and wherein each of the plurality of dichroic mirrors is configured to transmit the narrow-beam light from one of the plurality of light source modules to the optical collimator.

13. The system of claim 12, wherein each of the plurality of dichroic mirrors is configured to reflect a predetermined wavelength of the narrow-beam light and transmit all other wavelengths of the narrow-beam light.

14. A method of displaying graphics with a projector system for a head up display within a vehicle, comprising:

projecting, with a vehicle vector graphics projector, a second graphical image onto an inner surface of a windshield of the vehicle, the second graphical image having a greater brightness than a first graphical image and including at least one vehicle tell-tale; and testing and calibrating, with a calibration system, a displayed vehicle tell-tale within the second graphical image;

the calibration system including a reference calibration system having a reference windshield, a reference vector graphics projector, wherein the reference vector graphics projector includes a reference vector graphics projector camera, a reference camera, and a reference controller in electrical communication with the reference vector graphics projector and the reference camera, the method further including, with the reference controller:

projecting a reference graphic on the reference windshield using the reference vector graphics projector, wherein the reference graphic is a vehicle tell-tale and includes a plurality of projected dots arranged in a two-dimensional array, and wherein an intended x-coordinate and an intended y-coordinate of each of the plurality of projected dots is defined by an intended reference graphic matrix;

capturing a first reference image of the reference graphic using the reference camera;

calculating at least one reference calibration matrix based at least in part on the first reference image of the reference graphic;

identifying a plurality of perceived dots of the reference graphic in the first reference image:

determining an actual x-coordinate and an actual y-coordinate of each of the plurality of perceived dots of the reference graphic in the first reference image;

generating an actual reference graphic matrix, wherein each element of the actual reference graphic matrix contains the actual x-coordinate and the actual y-coordinate of one of the plurality of perceived dots of the reference graphic in the first reference image;

calculating a reference camera deviation matrix by subtracting the actual reference graphic matrix from the intended reference graphic matrix, wherein the reference camera deviation matrix encodes deviations in the reference graphic due to characteristics of the reference windshield; and determining a reference vector graphics projector camera transformation matrix based at least in part on the reference camera deviation matrix.

15. The method of claim 14, wherein the determining a reference vector graphics projector camera transformation matrix based at least in part on the reference camera deviation matrix further includes:

generating a deviation-compensated reference graphic matrix by summing the intended reference graphic matrix and the reference camera deviation matrix;

projecting a deviation-compensated reference graphic on the reference windshield using the reference vector graphics projector, wherein a location of each of a plurality of projected dots of the deviation-compensated reference graphic is defined by the deviation-compensated reference graphic matrix;

capturing a second reference image of the deviation-compensated reference graphic using a reference vector graphics projector camera;

identifying a plurality of perceived dots of the deviation-compensated reference graphic in the second reference image;

determining an actual x-coordinate and an actual y-coordinate of each of the plurality of perceived dots of the deviation-compensated reference graphic in the second reference image;

generating a reference vector graphics projector camera matrix, wherein each element of the reference vector graphics projector camera matrix contains the actual x-coordinate and the actual y-coordinate of one of the plurality of perceived dots of the deviation-compensated reference graphic in the second reference image; and determining the reference vector graphics projector camera transformation matrix by subtracting the reference vector graphics projector camera matrix from the reference camera deviation matrix.

16. The method of claim 15, wherein the projecting, with the vector graphics projector, the second graphical image onto the inner surface of the windshield of the vehicle further includes:

producing, with a light-emitting diode (LED) array of a light source module, a source light;

receiving, with an optical bandpass filter of the light source module in optical communication with the LED array, the source light, and filtering, with the optical bandpass filter, the source light, and transmitting, through the optical bandpass filter, filtered light having a wavelength within a passband of the optical bandpass filter;

receiving, with a focusing lens of the light source module in optical communication with the optical filter, the filtered light, and transmitting, with the focusing lens, a narrow-beam light;

receiving, with an optical collimator in optical communication with the light source module, the narrow-beam light, and transmitting, with the optical collimator, a collimated light; and directing, with an optoelectrical mirror in optical communication with the optical collimator, the collimated light to form a graphic.

17. The method of claim 15, wherein the testing and calibrating, with the calibration system, the displayed vehicle tell-tale within the second graphical image further includes:

projecting the reference graphic on the vehicle windshield using the vehicle vector graphics projector;

capturing a calibration image of the reference graphic using a vehicle vector graphics projector camera;

calculating a vehicle vector graphics projector calibration matrix based at least in part on the at least one reference calibration matrix and the calibration image of the reference graphic; and applying the vehicle vector graphics projector calibration matrix to each frame projected using the vehicle vector graphics projector.

18. The method of claim 17, wherein the calculating the vehicle vector graphics projector calibration matrix further includes:

determining a vehicle vector graphics projector deviation matrix based at least in part on the reference vector graphics projector camera matrix and the calibration image of the reference graphic; and calculating the vehicle vector graphics projector calibration matrix based at least in part on the vehicle vector graphics projector deviation matrix by subtracting the vector graphics projector deviation matrix from the vector graphics projector camera transformation matrix.

19. The method of claim 18, wherein the determining the vehicle vector graphics projector deviation matrix further includes:

identifying a plurality of perceived dots of the reference graphic in the calibration image;

determining an actual x-coordinate and an actual y-coordinate of each of the plurality of perceived dots of the reference graphic in the calibration image;

generating an actual vehicle vector graphics projector matrix, wherein each element of the actual vehicle vector graphics projector matrix contains the actual x-coordinate and the actual y-coordinate of one of the plurality of perceived dots of the reference graphic in the calibration image; and calculating the vehicle vector graphics projector deviation matrix by subtracting the actual vehicle vector graphics projector matrix from the reference vector graphics projector camera matrix.

20. A vehicle having a projector system for a head up display within the vehicle, the projector system comprising:

a vehicle vector graphics projector adapted to project a second graphical image onto an inner surface of a windshield of the vehicle, the second graphical image having a greater brightness than a first graphical image and including at least one vehicle tell-tale; and a calibration system adapted to test and calibrate a displayed tell-tale within the second graphical image and including:

a reference windshield;

a reference vector graphics projector, wherein the reference vector graphics projector includes a reference vector graphics projector camera;

a reference camera; and a reference controller in electrical communication with the reference vector graphics projector and the reference camera, wherein the reference controller is programmed to:

project a reference graphic on the reference windshield using the reference vector graphics projector, wherein the reference graphic is a vehicle tell-tale and includes a plurality of projected dots arranged in a two-dimensional array, and wherein an intended x-coordinate and an intended y-coordinate of each of the plurality of projected dots is defined by an intended reference graphic matrix;

capture a first reference image of the reference graphic using the reference camera; and calculate at least one reference calibration matrix based at least in part on the first reference image of the reference graphic;

identify a plurality of perceived dots of the reference graphic in the first reference image;

determine an actual x-coordinate and an actual y-coordinate of each of the plurality of perceived dots of the reference graphic in the first reference image;

generate an actual reference graphic matrix, wherein each element of the actual reference graphic matrix contains the actual x-coordinate and the actual y-coordinate of one of the plurality of perceived dots of the reference graphic in the first reference image;

calculate a reference camera deviation matrix by subtracting the actual reference graphic matrix from the intended reference graphic matrix, wherein the reference camera deviation matrix encodes deviations in the reference graphic due to characteristics of the reference windshield; and determine a reference vector graphics projector camera transformation matrix based at least in part on the reference camera deviation matrix.

\* \* \* \* \*